(12) United States Patent
Levy et al.

(10) Patent No.: US 11,493,348 B2
(45) Date of Patent: Nov. 8, 2022

(54) METHODS FOR EXECUTING AUTONOMOUS RIDESHARE REQUESTS

(71) Applicant: Direct Current Capital LLC, Wilmington, DE (US)

(72) Inventors: Gahl Levy, Mountain View, CA (US); Chip J. Alexander, Mountain View, CA (US); Carol Reiley, Mountain View, CA (US)

(*) Notice: Subject to any disclaimer, the term of this patent is extended or adjusted under 35 U.S.C. 154(b) by 562 days.

(21) Appl. No.: 16/017,973

(22) Filed: Jun. 25, 2018

(65) Prior Publication Data

US 2019/0137290 A1 May 9, 2019

Related U.S. Application Data

(60) Provisional application No. 62/524,392, filed on Jun. 23, 2017.

(51) Int. Cl.
*G06Q 50/30* (2012.01)
*G01C 21/34* (2006.01)
*G05D 1/00* (2006.01)
*G05D 1/02* (2020.01)
*B60Q 1/50* (2006.01)
(Continued)

(52) U.S. Cl.
CPC .......... *G01C 21/3438* (2013.01); *B60Q 1/50* (2013.01); *G01C 21/3461* (2013.01); *G05D 1/0088* (2013.01); *G05D 1/0214* (2013.01); *G05D 1/0231* (2013.01); *G05D 1/0276* (2013.01); *G06Q 50/30* (2013.01);
(Continued)

(58) Field of Classification Search
CPC ............ G01C 21/3438; G01C 21/3461; G06Q 50/30; G06Q 10/083; G05D 1/0088; G05D 1/0231; G05D 1/0276; G05D 1/0214; G05D 2201/0213; B60Q 1/50; G06K 7/1413

See application file for complete search history.

(56) References Cited

U.S. PATENT DOCUMENTS 6,144,293 A 11/2000 Plaschko et al.
6,271,745 B1 8/2001 Anzai et al.
(Continued)

OTHER PUBLICATIONS

Du et al., "Comprehensive and Practical Vision System for Self-Driving Vehicle Lane-Level Localization," IEEE Transactions on Image Processing, vol. 25, No. 5, May 2016, pp. 2075-2088.
(Continued)

*Primary Examiner* — Masud Ahmed
(74) *Attorney, Agent, or Firm* — Polsinelli PC

(57) ABSTRACT

One variation of a method for executing autonomous rideshare requests includes: following arrival of an autonomous vehicle proximal a pickup location specified in a rideshare request submitted by a user, setting a user arrival timer for a first duration and a depart timer for a second duration exceeding the first duration; serving a state of the user arrival timer to a mobile computing device affiliated with the user; rendering a state of the depart timer on an external display arranged on the autonomous vehicle; in response to failure of the user to arrive at the autonomous vehicle prior to expiration of the user arrival timer, departing from the pickup location without the user; and, in response to the user arriving at the autonomous vehicle prior to expiration of the user arrival timer, departing from the pickup location with the user prior to expiration of the delay timer.

20 Claims, 4 Drawing Sheets

(51) Int. Cl.
  *G06K 7/14* (2006.01)
  *G06Q 10/08* (2012.01)
(52) U.S. Cl.
  CPC ... *G05D 2201/0213* (2013.01); *G06K 7/1413* (2013.01); *G06Q 10/083* (2013.01)

(56) References Cited

U.S. PATENT DOCUMENTS

| | | | |
|---|---|---|---|
| 6,505,780 B1 | 1/2003 | Yassin et al. | |
| 6,992,562 B2 | 1/2006 | Fuks et al. | |
| 7,146,129 B2 | 12/2006 | Bostrom | |
| 7,672,666 B2 | 3/2010 | Hasan | |
| 7,698,078 B2 | 4/2010 | Kelty et al. | |
| 7,821,383 B2 | 10/2010 | Sultan et al. | |
| 7,928,829 B2 | 4/2011 | Hermann | |
| 8,024,116 B2 | 9/2011 | Terao | |
| 8,121,347 B2 | 2/2012 | Metaxas et al. | |
| 8,207,860 B2 | 6/2012 | Enegren et al. | |
| 8,299,895 B2 | 10/2012 | Harris | |
| 8,634,822 B2 | 1/2014 | Silver et al. | |
| 8,736,438 B1 | 5/2014 | Vasquez et al. | |
| 8,937,528 B2 | 1/2015 | Protopapas | |
| 8,947,202 B2 | 2/2015 | Tucker et al. | |
| 9,035,750 B2 | 5/2015 | Sah et al. | |
| 9,218,814 B2 | 12/2015 | Xiong | |
| 9,351,102 B2 | 5/2016 | Tucker et al. | |
| 9,405,363 B2 | 8/2016 | Hernandez-Abrego et al. | |
| 9,623,905 B2 | 4/2017 | Shashua et al. | |
| 9,769,616 B1 | 9/2017 | Pao et al. | |
| 9,855,926 B2 | 1/2018 | Stauffer et al. | |
| 9,911,166 B2 | 3/2018 | Reid et al. | |
| 9,950,708 B1 | 4/2018 | Cullinane et al. | |
| 10,065,659 B2 | 9/2018 | Deligianni et al. | |
| 10,104,525 B1 | 10/2018 | Kaiser et al. | |
| 10,202,100 B1 | 2/2019 | Tucker et al. | |
| 10,227,063 B2 | 3/2019 | Abreu | |
| 10,248,119 B2 | 4/2019 | Kentley-Klay et al. | |
| 10,311,704 B1 | 6/2019 | Xu et al. | |
| 10,336,294 B2 | 7/2019 | Grossmann | |
| 10,354,232 B2 | 7/2019 | Tomlin, Jr. et al. | |
| 10,482,226 B1 | 11/2019 | Konrardy et al. | |
| 10,572,851 B2 * | 2/2020 | Skaaksrud | H04W 4/029 |
| 10,818,188 B2 | 10/2020 | Reiley et al. | |
| 10,853,629 B2 | 12/2020 | Blanc-Paques et al. | |
| 10,974,829 B2 | 4/2021 | Myslinski | |
| 2002/0118579 A1 | 8/2002 | Lucy et al. | |
| 2003/0204290 A1 | 10/2003 | Sadler et al. | |
| 2003/0209893 A1 | 11/2003 | Breed et al. | |
| 2003/0231550 A1 | 12/2003 | Macfarlane | |
| 2005/0001028 A1 | 1/2005 | Zuili | |
| 2006/0244830 A1 | 11/2006 | Davenport et al. | |
| 2006/0267407 A1 | 11/2006 | Nagaoka et al. | |
| 2006/0267781 A1 | 11/2006 | Coulter | |
| 2007/0262574 A1 | 11/2007 | Breed et al. | |
| 2008/0106908 A1 * | 5/2008 | Englander | B60Q 1/24 362/481 |
| 2010/0087987 A1 | 4/2010 | Huang et al. | |
| 2010/0091995 A1 | 4/2010 | Chen et al. | |
| 2010/0211770 A1 | 8/2010 | Alrabady et al. | |
| 2010/0253602 A1 | 10/2010 | Szczerba | |
| 2010/0262348 A1 | 10/2010 | Nallapa et al. | |
| 2010/0289632 A1 | 11/2010 | Seder et al. | |
| 2011/0119734 A1 | 5/2011 | Crawford | |
| 2011/0264304 A1 | 10/2011 | Burzio | |
| 2011/0275408 A1 | 11/2011 | Kulik | |
| 2012/0042036 A1 | 2/2012 | Lau et al. | |
| 2012/0075059 A1 | 3/2012 | Fyke et al. | |
| 2012/0083982 A1 | 4/2012 | Bonefas et al. | |
| 2012/0126000 A1 | 5/2012 | Kunzig et al. | |
| 2012/0321175 A1 | 12/2012 | Hedau et al. | |
| 2013/0030882 A1 | 1/2013 | Davis, III et al. | |
| 2013/0104203 A1 | 4/2013 | Davis et al. | |
| 2013/0143594 A1 | 6/2013 | Ghabra et al. | |
| 2013/0190981 A1 | 7/2013 | Dolinar et al. | |
| 2013/0204455 A1 | 8/2013 | Chia et al. | |
| 2013/0222525 A1 | 8/2013 | Forghieri | |
| 2013/0332007 A1 | 12/2013 | Louboutin | |
| 2014/0016821 A1 | 1/2014 | Arth et al. | |
| 2014/0039784 A1 * | 2/2014 | Millspaugh | G08G 1/202 701/300 |
| 2014/0070917 A1 | 3/2014 | Protopapas | |
| 2014/0089143 A1 | 3/2014 | Dione | |
| 2014/0162598 A1 | 6/2014 | Villa-Real | |
| 2015/0032621 A1 | 1/2015 | Kar et al. | |
| 2015/0045013 A1 | 2/2015 | Simmons | |
| 2015/0048927 A1 | 2/2015 | Simmons | |
| 2015/0199685 A1 | 7/2015 | Betancourt et al. | |
| 2015/0210287 A1 | 7/2015 | Penilla et al. | |
| 2015/0241241 A1 | 8/2015 | Cudak et al. | |
| 2015/0332425 A1 * | 11/2015 | Kalanick | G06Q 50/30 705/13 |
| 2015/0350378 A1 | 12/2015 | Hertel et al. | |
| 2015/0350846 A1 | 12/2015 | Chen et al. | |
| 2015/0379793 A1 | 12/2015 | Murakami | |
| 2016/0171574 A1 | 6/2016 | Paulucci et al. | |
| 2016/0182971 A1 | 6/2016 | Ortiz et al. | |
| 2016/0209489 A1 | 7/2016 | Schrabler et al. | |
| 2016/0292507 A1 | 10/2016 | Ghoson et al. | |
| 2016/0332535 A1 | 11/2016 | Bradley et al. | |
| 2016/0373922 A1 | 12/2016 | Shanmugam et al. | |
| 2017/0010121 A1 | 1/2017 | Shashua et al. | |
| 2017/0010618 A1 | 1/2017 | Shashua et al. | |
| 2017/0021282 A1 | 1/2017 | Comploi | |
| 2017/0080900 A1 | 3/2017 | Huennekens et al. | |
| 2017/0091856 A1 | 3/2017 | Canberk et al. | |
| 2017/0126810 A1 | 5/2017 | Kentley et al. | |
| 2017/0153714 A1 | 6/2017 | Gao et al. | |
| 2017/0169314 A1 | 6/2017 | Dijkman et al. | |
| 2017/0178269 A1 * | 6/2017 | McKinnon | G06Q 50/30 |
| 2017/0166222 A1 | 7/2017 | James | |
| 2017/0213164 A1 * | 7/2017 | Rainbolt | B60W 40/08 |
| 2017/0247040 A1 | 8/2017 | Miller et al. | |
| 2017/0270490 A1 | 9/2017 | Penilla et al. | |
| 2017/0330044 A1 | 11/2017 | Telpaz et al. | |
| 2018/0039276 A1 | 2/2018 | Keivan et al. | |
| 2018/0091604 A1 * | 3/2018 | Yamashita | G06Q 50/30 |
| 2018/0126960 A1 | 5/2018 | Reibling et al. | |
| 2018/0215392 A1 | 8/2018 | Kosaka et al. | |
| 2018/0285659 A1 | 10/2018 | Kwant et al. | |
| 2018/0300564 A1 | 10/2018 | Kwant et al. | |
| 2018/0315021 A1 * | 11/2018 | Bijor | G06Q 10/1093 |
| 2018/0356830 A1 | 12/2018 | Haghighat et al. | |
| 2018/0357907 A1 | 12/2018 | Reiley et al. | |
| 2018/0364723 A1 | 12/2018 | Cullinane et al. | |
| 2018/0365400 A1 | 12/2018 | Lopez-Hinojosa et al. | |
| 2018/0373941 A1 | 12/2018 | Kwant et al. | |
| 2019/0034694 A1 | 1/2019 | Ross | |
| 2019/0034740 A1 | 1/2019 | Kwant et al. | |
| 2019/0035101 A1 | 1/2019 | Kwant et al. | |
| 2019/0039570 A1 | 2/2019 | Foster et al. | |
| 2019/0063942 A1 | 2/2019 | Kang | |
| 2019/0176837 A1 | 6/2019 | Williams et al. | |
| 2019/0197325 A1 | 6/2019 | Reiley et al. | |
| 2019/0297450 A1 | 9/2019 | Hwang et al. | |
| 2019/0318159 A1 | 10/2019 | Blanc-Paques et al. | |
| 2019/0369636 A1 | 12/2019 | Nishiyama et al. | |
| 2019/0384294 A1 | 12/2019 | Shashua et al. | |
| 2019/0389486 A1 | 12/2019 | Murad et al. | |
| 2019/0391250 A1 | 12/2019 | Cohen et al. | |
| 2020/0005059 A1 | 1/2020 | Yamada et al. | |
| 2020/0010051 A1 | 1/2020 | Dumov | |
| 2020/0012979 A1 | 1/2020 | Song et al. | |
| 2020/0043063 A1 | 2/2020 | London | |
| 2020/0057487 A1 | 2/2020 | Sicconi et al. | |
| 2020/0094963 A1 | 3/2020 | Myslinski | |
| 2020/0117929 A1 | 4/2020 | Moon | |
| 2020/0124428 A1 | 4/2020 | Hamilton et al. | |
| 2020/0223454 A1 | 7/2020 | Fox et al. | |
| 2020/0226497 A1 * | 7/2020 | Hirose | G06Q 10/04 |
| 2020/0293799 A1 | 7/2020 | Herman | |

(56) References Cited

U.S. PATENT DOCUMENTS

2020/0257301 A1    8/2020   Weiser et al.
2021/0110182 A1    4/2021   Darnaud et al.

OTHER PUBLICATIONS

Song, Wei, U.S. Appl. No. 16/049,761, filed Jul. 30, 2018.
Song, Wei, U.S. Appl. No. 16/049,762, filed Jul. 30, 2018.

* cited by examiner

METHODS FOR EXECUTING AUTONOMOUS RIDESHARE REQUESTS

CROSS-REFERENCE TO RELATED APPLICATIONS

This Application claims the benefit of U.S. Provisional Application No. 62/524,392, filed on 23 Jun. 2017, which is incorporated in its entirety by this reference.

TECHNICAL FIELD

This invention relates generally to the field of autonomous vehicles and more specifically to a new and useful method for executing autonomous rideshare requests in the field of autonomous vehicles.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. First Method: Delivery

Figure 1:
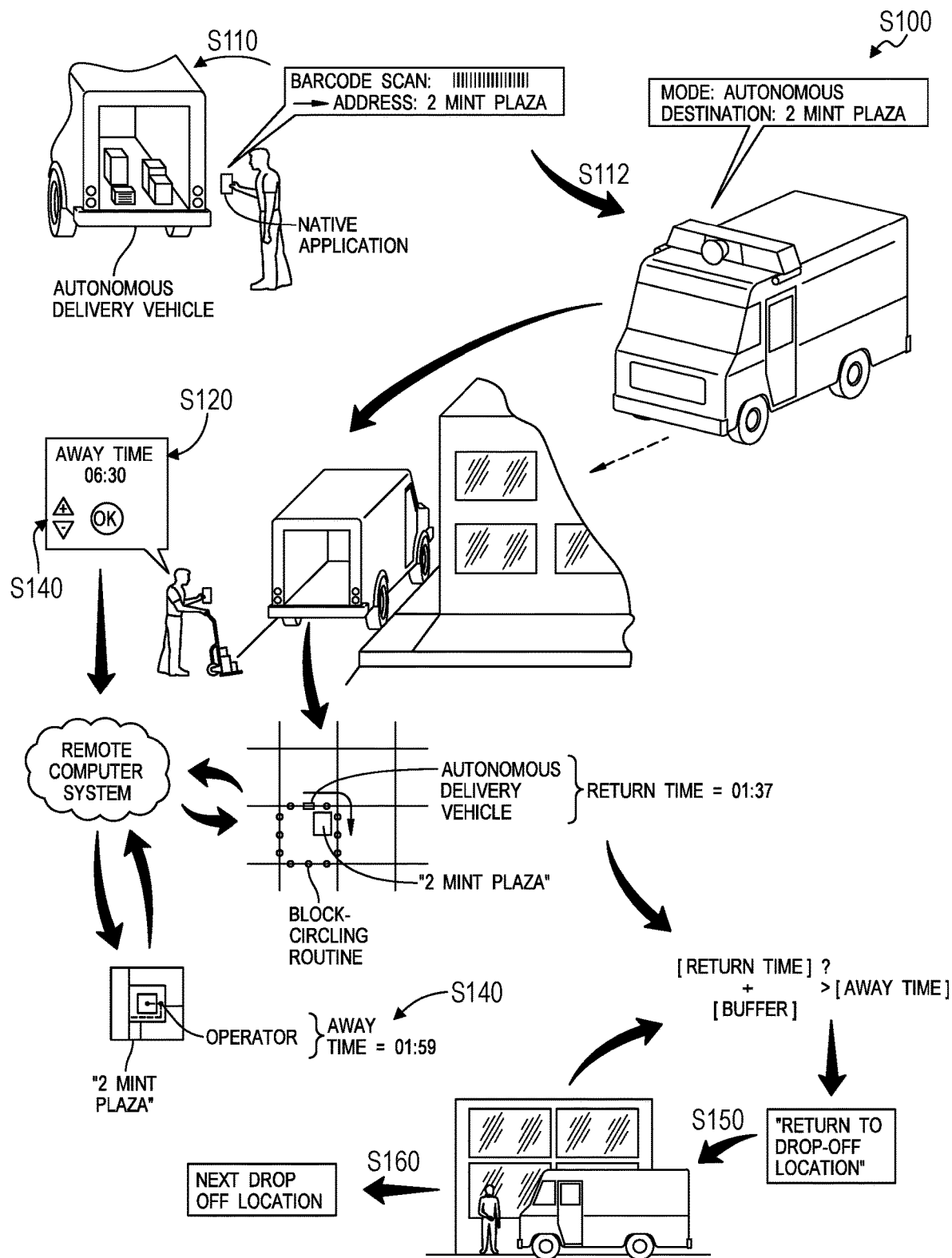
FIG. 1 is a flowchart representation of a first method.

As shown in FIG. 1, a first method S100 for autonomously shuttling an operator between locations along a delivery route includes: receiving selection of a dropoff location in Block S110; at an autonomous vehicle (hereinafter "autonomous vehicle"), autonomously navigating to the dropoff location in Block S112; estimating an away time for manual delivery of a package by an operator at the dropoff location in Block S120; at the autonomous vehicle, in response to the operator disembarking from the autonomous vehicle with the package, autonomously navigating away from the dropoff location by a distance based on the away time in Block S130; adjusting the away time based on an input by the operator at a mobile computing device carried by the operator in Block S140; at the autonomous vehicle, in response to proximity of expiration of the away time, autonomously navigating back to the dropoff location in Block S150; and, in response to the operator boarding the autonomous vehicle, autonomously navigating to a second dropoff location in Block S160.

1.1 Applications

Generally, Blocks of the first method S100 can be implemented by an autonomous vehicle to: drop off a human operator at a dropoff location (e.g., at a front door of a building); to autonomously navigate (i.e., drive) streets around the dropoff location while the operator manually picks up and/or delivers one or more packages to a building at the dropoff location; and autonomously navigate back to the dropoff location to collect the operator as the operator's pickup and/or delivery rotation nears completion. In particular, the autonomous vehicle can execute Blocks of the first method S100: to dropoff a human operator at or near an entry of a building to achieve a high degree of convenience to the human operator when completing manual pickups and/or deliveries at the building; to navigate away from the entry of the building in order to limit or avoid obstruction to street traffic that may otherwise occur if the autonomous vehicle remained parked (e.g., double-parked) outside the entry of the building; and to automatically return back to the dropoff location to collect the operator as the operator's pickup or delivery rotation approaches completion in order to limit the operator's downtime and maintain high pickup and delivery efficiency for the operator.

Furthermore, Blocks of the first method S100 can be implemented by the autonomous vehicle in conjunction with a remote computer system (e.g., a remote server) and/or a native application executing on a mobile computing device (e.g., a smartphone, a tablet, a handheld scanner) carried by the operator, as shown in FIG. 1. For example, the remote computer system can manage a fleet of autonomous vehicles and can selectively dispatch the autonomous vehicle to a sequence of dropoff locations based on destinations of packages loaded into the autonomous vehicle. In this example, the remote computer system can track the operator's location throughout a delivery (and/or pickup) rotation at a building through the native application executing on the operator's mobile computing device and selectively query the autonomous vehicle to return to the dropoff location to collect the operator as the delivery (and/or pickup) rotation nears completion at the building. The native application can additionally or alternatively: enable the operator to manually enter a predicted or proposed away duration prior to leaving the autonomous vehicle at the beginning of a delivery rotation; and/or enable the operator to manually extend or shorten a preset duration of the delivery rotation in real-time.

Therefore, Blocks of the first method S100 can be executed by an autonomous vehicle, a remote computer system, and a native application executing on a mobile computing device (hereinafter a "system") to support a human operator: collecting a lunch order from a restaurant; delivering a lunch order to a business; collecting groceries from a grocer; delivering groceries to a residential or commercial building; collecting a package from a distribution center; and/or delivering a package to a residential or commercial building; etc.

The autonomous vehicle can be dispatched and operated within a densely-populated area (e.g., a city, metropolitan area) with limited street parking, which may otherwise necessitate double-parking vehicles at delivery locations or parking significant distances away from delivery locations. In particular, rather than double-park a vehicle outside of an entry of a building while the human operator manually collects a package from or delivers a package to the building, which may obstruct traffic, and rather than park a vehicle in a parking space distant from the entry of the building, which may reduce the human operator's efficiency in picking up and delivering packages, the autonomous vehicle can unload the operator and necessary packages at a dropoff location near a desired entry of a building, move with traffic away from the dropoff location while the operator completes the pickup or delivery rotation inside the building, and then return back to the dropoff location (or another pickup location convenient for the operator) to collect the operator with minimal wait time for the operator and the autonomous vehicle. However, the autonomous vehicle can be dispatched or operated in any other environment to maintain high efficiency for human operators completing delivery routines out of the autonomous vehicle while limiting impact on traffic flow.

1.2 Autonomous Vehicle

The autonomous vehicle can include: a suite of sensors configured to collect information about the autonomous vehicle's environment; local memory storing a navigation map defining a route for execution by the autonomous vehicle and a localization map that the autonomous vehicle implements to determine its location in real space; and a controller. The controller can: determine the location of the autonomous vehicle in real space based on sensor data collected from the suite of sensors and the localization map; determine the context of a scene around the autonomous vehicle based on these sensor data; elect a future action (e.g., a navigational decision) based on the context of the scene around the autonomous vehicle, the real location of the autonomous vehicle, and the navigation map, such as further based on a deep learning and/or artificial intelligence model; and control actuators within the vehicle (e.g., accelerator, brake, and steering actuators) according to elected decisions.

In one implementation, the autonomous vehicle includes one or more 360° LIDAR sensors arranged on the top of the autonomous vehicle, such as at each of the front and rear of the autonomous vehicle. Each LIDAR sensor can output one three-dimensional distance map—such as in the form of a 3D point cloud representing distances between the LIDAR sensor and the external surface within the field of view of the LIDAR sensor—per rotation of the LIDAR sensor (i.e., once per scan cycle). The autonomous vehicle can additionally or alternatively include: a set of infrared emitters configured to project structured light into a field near the autonomous vehicle; a set of infrared detectors (e.g., infrared cameras); and a processor configured to transform images output by the infrared detector(s) into a depth map of the field. The autonomous vehicle can also include one or more color cameras facing outwardly from the front, rear, and left lateral and right lateral sides of the autonomous vehicle. For example, each camera can output a video feed containing a sequence of digital photographic images (or "frames"), such as at a rate of 20 Hz. Furthermore, the autonomous vehicle can include a set of infrared proximity sensors arranged along the perimeter of the base of the autonomous vehicle and configured to output signals corresponding to proximity of objects and pedestrians within one meter of the autonomous vehicle.

The autonomous vehicle can also implement one or more local neural networks to process LIDAR feeds (i.e., sequences of LIDAR images), video feeds (or sequences of color photographic images), and/or other sensor data substantially in real-time in order to localize the autonomous vehicle to a known location and orientation in real space, to interpret (or "perceive") its surroundings, and to then select and execute navigational actions. For example, a controller integrated into the autonomous vehicle can: pass LIDAR and video feeds into a localization/perception neural network to detect and characterize static objects—such as lane markers, lane reflectors, curbs, road signs, telephone poles, and building facades—near the autonomous vehicle substantially in real-time; and then compare types and relative locations of these static objects to a localization map to determine the autonomous vehicle's position in real space. In this example, the neural network can also detect and characterize dynamic objects—such as other vehicles, pedestrians, and cyclists—in the LIDAR and video feeds; and the controller can perceive the autonomous vehicle's local environment based on proximity, speed, and types of these nearby dynamic objects. The controller can then select a next navigational action—such as including a target wheel angle, road speed, acceleration, or deceleration (e.g., brake position)—to move toward a specified destination based on the autonomous vehicle's current position and the scene around the vehicle, such as by passing the autonomous vehicle's position, identified dynamic objects in the local scene, and the autonomous vehicle's destination into a navigational model (e.g., a navigating neural network).

The autonomous vehicle can therefore implement one or more neural networks locally to determine its location, perceive its surroundings, and select future actions. The remote computer system can implement Blocks of the first method S100: to collect LIDAR, video, and/or other optical data from the autonomous vehicle, other autonomous vehicles, and/or manually-operated road vehicles with similar sensor suites; to interface with human annotators to attribute localization-, perception-, and motion planning-related labels to these optical data; and to generate and refine localization/perception, navigational, and/or other neural networks—for implementation by these autonomous vehicles—over time. However, the autonomous vehicle can include any other type or arrangement of sensors and can implement any other methods or techniques to autonomously navigate public and private streets, alleys, and other roadways.

The autonomous vehicle can also include a storage area configured to store packages for delivery, such as to a final recipient or back to a distribution center. The autonomous vehicle can also include a cabin configured to house one or more human operators: who board the autonomous vehicle between delivery rotations; and who disembark from the autonomous vehicle with a package from the storage area to complete delivery rotations.

Generally, the first method S100 is described herein as executed in conjunction with a ground-based autonomous commercial vehicle. However, Blocks of the first method S100 can be executed in conjunction with a wheeled vehicle of any other type and in both commercial and private settings, as described below.

1.3 Dropoff Location

Block S110 of the first method S100 recites receiving selection of a dropoff location; and Block S120 of the first method S100 recites, at an autonomous vehicle, autonomously navigating to the dropoff location.

In one implementation, the operator enters an address of a dropoff location directly into an instance of the native application executing on a mobile computing device assigned to the operator or into a control interface within the autonomous vehicle. Alternatively, the operator can scan an address (e.g., a textual address, a barcode, and QR code, a RFID UUID) from a package—loaded into the autonomous vehicle—via the mobile computing device, such as upon conclusion of a previous delivery rotation and before navigating to a dropoff location of a next delivery rotation, as shown in FIG. 1. The native application can then return this address or location back to the remote computer system or directly to the autonomous vehicle for calculation and execution of a route from the autonomous vehicle's current location to the selected dropoff location. Alternatively, the remote computer system can: maintain master control of a fleet of autonomous vehicles; can set a sequence of dropoff locations for each autonomous vehicle in the fleet based on packages currently loaded into these autonomous vehicles and planned (e.g., timed) pickups assigned to these autonomous vehicles; and can selectively distribute dropoff locations to these autonomous vehicles over time as delivery rotations are completed at each autonomous vehicle. However, the system can access a dropoff location in any other way in Block S110.

The autonomous vehicle can then implement autonomous navigation techniques to navigate from its current location, along public or private roads, to the specified dropoff location in Block S120, such as while the operator assembles a load of packages—for delivery at the next dropoff location—inside the storage area of the autonomous vehicle. Alternatively, the operator can manually operate the autonomous vehicle between dropoff locations, and the autonomous vehicle can autonomously navigate to and from the dropoff location to reduce obstruction to traffic while the operator completes the pickup and dropoff rotation.

1.4 Away Time

Block S120 of the first method S100 recites estimating an away time for manual delivery of a package by an operator at the dropoff location. Generally, in Block S120, the system sets a duration of a delay routine (described below) in which the autonomous vehicle navigates away from the dropoff location in Block S130, such as based on a manual input by the operator, based on historical delivery durations, or by tracking the operator in real-time as the operator performs the pickup and dropoff rotation.

1.4.1 Preset Away Time

In one implementation, the operator manually enters a predicted away time in the native application executing on her mobile computing device or into a control panel within the autonomous vehicle, such as before disembarking from the autonomous vehicle at the start of a delivery rotation.

In this implementation, the system can also recommend an away time for the upcoming delivery rotation. In one example, the remote computer system can access a database of historical durations of delivery (and/or pickup) rotations at the same building address, for the same floor of the building, and/or for the same target destination (e.g., suite) within the building. The remote computer system can then calculate and propose an average of these durations to the operator through the native application or through the control panel within the autonomous vehicle; and the operator can manually confirm this duration or adjust this duration, such as based on a number of packages scheduled for delivery (or pickup) during the current delivery rotation to set the away time.

The remote computer system can also automatically adjust this proposed away time based on a known number of packages scheduled for delivery (or pickup) or discrete destinations within the building and based on known locations of these destinations. For example, the remote computer system can: access a floor plan or interior map of the building; calculate a path from the dropoff location through the building to complete each scheduled delivery and/or pickup within the building; and estimate the away time based on the length of this path, a typical or average speed of the operator (or a population of operators), a number of elevator flights to reach all destinations, and a typical elevator wait time for the building or a group of like buildings, etc. In this example, the computer system can access historical path data of operators completing pickups and deliveries at the building—such as including average elevator wait times, average elevator speeds, average concierge check in times, average pickup and/or dropoff times at various suites or other destinations within the building, etc.—to automatically calculate or adjust this proposed away time. The remote computer system can then serve this proposed away time to the operator for confirmation via the native application or the control panel within the autonomous vehicle, as described above.

Alternatively, in the foregoing implementation, the remote computer system can: implement the proposed away time directly; serve the proposed away time to the autonomous vehicle for calculation and execution of a delay routine once the operator disembarks from the vehicle; and serve the proposed away time to the native application for presentation to the operator as a countdown time indicating a time at which the autonomous vehicle will return to the dropoff location.

Upon receipt of this away time, the autonomous vehicle (or the remote computer system) can calculate a block-circling route that moves the autonomous vehicle away from and then back to the dropoff location based on the away time and local traffic conditions, as described below. The autonomous vehicle can then execute the block-circling route accordingly in Block S130.

1.4.2 Manual Adjustment

Block S140 recites adjusting the away time based on an input by the operator at a mobile computing device carried by the operator. Generally, in Block S140, the system can interface with the operator via the native application to adjust the away time in real-time during the delivery routine. In one implementation the native application initializes a countdown time according to the away time once the operator leaves the autonomous vehicle and renders the countdown timer on the display of the mobile computing device to indicate a remaining time until the autonomous vehicle is scheduled to return to the dropoff location, as described above. Throughout the delivery rotation, the operator can: monitor the countdown timer; and select a first input region on the mobile computing device to add time (e.g., 30 seconds) to the countdown timer and/or select a second input region on the mobile computing device to remove time (e.g., 30 seconds) from the countdown timer according to her perceived degree of completion of the delivery rotation.

To assist the operator in manually estimating a proportion of completion of the delivery rotation and therefore a total remaining time necessary to complete the delivery rotation, the native application can monitor completed deliveries within the building. For example, to complete delivery of a package, the operator can scan a barcode or other identifier on the package or collect a signature from a recipient in order to register the package as delivered. With delivery of the package thus registered as completed, the native application can update a package delivery (and pickup) counter rendered on the display of the mobile computing device to visually indicate to the operator a percentage of the delivery rotation that is complete.

In the implementation described above in which the remote computer system calculates a path from the dropoff location through the building to complete each scheduled delivery and/or pickup within the building, the remote computer system can serve a floor plan or interior map of the building and a map overlay defining this path to the native application. The native application can then render this interior map and map overlay on the display of the mobile computing device to provide additional visual information to the operator when adding or removing time from the countdown timer in real-time during the delivery rotation. In this implementation, the native application can also render a pin on the path representing the operator's location upon receipt of confirmation of delivery of a package and a known destination (e.g., suite) of the package within the building. Similarly, the native application can update the path to highlight a section of the path that has been completed based on known destinations of packages that have been registered as delivered.

Alternatively, the native application can: interface with the remote computer system and/or other external systems to track the location of the operator within the building; and update a position of a pin on a map of the building rendered on the mobile computing device based on the location of the operator. For example, the native application can interface with a GPS sensor and/or a wireless communication module within the mobile computing device to estimate a location of the mobile computing device—and therefore the operator—within the building. In this example, the native application can also interface with a step counter (or directly with an IMU) within the mobile computing device to track motion of the operator, implement dead reckoning to estimate the displacement of the operator, and confirm or adjust a GPS- or wireless network-based estimate of the operator's location within the building over time. The native application can then update—on the display of the mobile computing device—a pin representing the location of the operator within the building or update the map overlay to indicate a section of the planned path that the operator has completed. The operator can thus review the countdown timer and the map of the building and manually adjust the countdown timer accordingly through the native application in Block S140.

1.4.3 Automated Adjustment

Alternatively, the native application and/or the remote computer system can automatically adjust the countdown timer based on the operator's progress during the delivery rotation, as shown in FIG. 1. In particular, the native application can: implement methods and techniques described above to track the location of the mobile computing device—and therefore the location of the operator—within the building; compare the operator's location to the planned path to calculate a proportion of the delivery rotation remaining; and increase or decrease the countdown timer to reflect the actual proportion of the delivery rotation completed at the current time.

In one example, the native application (or the remote computer system): tracks (or approximates) the location of the operator within the building, as described above; and compares the location of the operator to a known location of a destination for each remaining delivery (and pickup) within the building to calculate a remaining distance from the operator's current location, to each delivery (and pickup) destination, and back to the dropoff site outside of building. The native application then accesses a walking speed of the operator, such as based on a step rate output by a step counter within the mobile computing device, based on a rate of change of the operator's location during the delivery rotation, or by retrieving an average speed of the operator or a population of operators across multiple deliveries. The native application then automatically recalculates the remaining away time by dividing the remaining distance by the operator's speed and adding: elevator wait times; elevator flight times going up and coming back down to a ground floor of the building; patron interaction times for each delivery (and pickup); and an average or preset concierge checkout duration; etc. The native application updates the countdown timer accordingly.

1.5 Return Trigger

In another variation, the operator manually triggers return of the autonomous vehicle to the dropoff location through the native application. In one example, once the operator completes a last delivery in the building, the operator can open the native application to indicate that last delivery is complete, thereby triggering the remote computer system to prompt the autonomous vehicle to return to the dropoff location. In a similar example, the operator scans a barcode or other identifier on a package or collects a signature from a recipient of a package at the native application; upon receipt of such confirmation of delivery of the final package (or collection of a final pickup) in the building, the native application or the remote computer system can return a prompt to the autonomous vehicle to return to the dropoff location.

In a similar implementation, when the operator is halfway through completion of deliveries (and pickups) within the building, the operator can manually request return of the autonomous vehicle to the dropoff location through the native application. Alternatively, the native application or the remote computer system can automatically serve a prompt to return to the dropoff location when the delivery rotation is halfway complete, such as determined by a proportion of deliveries marked as complete and/or the location of the operator within the building.

In another implementation, the remote computer system can: interface with a traffic service and/or access traffic data collected by the autonomous vehicle during execution of the delay routine; track the location of the autonomous vehicle; and estimate a return time for the autonomous vehicle to return to the dropoff location. The remote computer system can also interface with the native application: to track the location of the operator or estimate the location of the operator within the building based on completed deliveries (and/or pickups); and estimate a remaining away time for the operator to complete the delivery rotation before returning to the dropoff location, as described above. The remote computer system can repeat these calculations regularly during the delay routine, such as at a rate of once per ten-second interval. When the return time for the autonomous vehicle and the remaining away time for the operator substantially match, the remote computer system can serve a prompt to the autonomous vehicle to return (i.e., autonomously navigate back) to the dropoff location. In this implementation, the remote computer system can also implement a time buffer such that the autonomous vehicle returns to the dropoff location before the operator, thereby limiting or eliminating operator wait time. For example, if the return time is less than the remaining away time and differs from the remaining away time by less than a buffer time of fifteen seconds, the remote computer system can trigger the autonomous vehicle to return to the dropoff location, as shown in FIG. 1. In this example, the remote computer system can also dynamically adjust the buffer time. For example, because accuracy of an estimated time for the autonomous vehicle to return to the dropoff location may be inversely proportional to traffic density, the remote computer system can increase the buffer timer if greater traffic density is detected between the autonomous vehicle and the dropoff location, and vice versa.

Furthermore, the remote computer system can implement the foregoing methods and techniques at the start of the delivery rotation in order to determine whether: to prompt the autonomous vehicle to execute a delay routine if local traffic density is sufficiently low and the estimated away time is sufficiently large; or to prompt the autonomous vehicle to remain parked at the dropoff location while waiting for the operator's return if local traffic density exceeds a threshold density or the estimated away time is sufficiently small.

1.6 Delay Routine

Block S130 of the first method S100 recites, at the autonomous vehicle, in response to the operator disembarking from the autonomous vehicle with the package, autonomously navigating away from the dropoff location by a distance based on the away time. Generally, in Block S130, the autonomous vehicle autonomously navigates away from the dropoff location—rather than double-parking in the street outside the dropoff location while the operator manually completes a delivery rotation—in order to limit impact on flow of local traffic and then returns to the dropoff location to collect the operator once the delivery rotation is complete. In particular, once the operator disembarks from the autonomous vehicle at the start of a delivery rotation (and the remote computer system determines that local traffic conditions and the estimated away time warrant a delay routine), the autonomous vehicle autonomously navigates streets nearby to avoid obstruction to flow of local traffic outside the dropoff location while the operator completes the delivery rotation.

1.6.1 Block Selection and Navigation

In one implementation, the autonomous vehicle autonomously circles a single block around the building occupied by the operator during the delay routine, as shown in FIG. 1. In this implementation, the autonomous vehicle can execute a sequence of right turns only at a speed consistent with or slightly less than (e.g., 80% of) the speed of nearby traffic moving in the same direction in order to navigate fully around the single block. The autonomous vehicle can repeat this route until the operator has completed the delivery rotation and is heading back toward the dropoff location.

Similarly, the autonomous vehicle can circle a group of blocks around the dropoff location during the delay routine. For example, the autonomous vehicle can execute a sequence of right turns only to navigate around a 1×2, 1×3, 1×4, 2×2, 2×3, or 2×4, etc. grid array of blocks. In this example, the remote computer system (or the autonomous vehicle) can define a grid array of blocks—for circling by the autonomous vehicle—of area proportional to the away time set or estimated for the delivery rotation and inversely proportional to local traffic density. In particular, the autonomous vehicle can circle a large cluster of blocks around the dropoff location for longer estimated away times and lower local traffic densities; and vice versa. The remote computer system (or the autonomous vehicle) can also dynamically reduce the size of the grid array of blocks circumvented by the autonomous vehicle as the countdown timer nears completion, thereby drawing the autonomous vehicle closer to the dropoff location as the delivery rotation nears completion and reducing possibility of the autonomous vehicle's delayed arrival at the dropoff location.

In another implementation, if the autonomous vehicle detects heavy vehicle or pedestrian traffic, construction, or another obstruction near the dropoff location, the autonomous vehicle can navigate to and circle another block (or group of blocks) nearby in order to avoid or reduce exposure to such obstructions. In this implementation, the remote computer system (or the autonomous vehicle): can set a maximum distance from the dropoff location proportional to remaining time on the countdown timer (i.e., proportional to the remaining away time); interface with an external traffic system to detect a lower-traffic block(s) within this maximum distance; and then dispatch the autonomous vehicle to circle this other block(s) nearby.

However, the autonomous vehicle and/or the remote computer system can select a block or group of blocks to circle according to any other schema.

1.6.2 Navigation Modes

During a delay routine, the autonomous vehicle can target navigation along slowest lanes or slow moving traffic in order to minimize distance traversed by the autonomous vehicle and therefore energy consumed by the autonomous vehicle during the delay routine. As the remaining away time diminishes, the autonomous vehicle can merge into faster traffic in order to return to the dropoff location in time to meet the operator.

In another variation, the autonomous vehicle can target navigation to low-traffic lanes and alleys. Once occupying a low-traffic lane or alley near the dropoff location, the autonomous vehicle can move at a minimum speed that impacts flow of traffic. For example, the autonomous vehicle can navigate to and stop in an alley near the dropoff location until the operator or remote computer system calls the autonomous vehicle to return to the dropoff location or until another vehicle approaches the autonomous vehicle. While stopped in the alley, the autonomous vehicle can continue to scan its surroundings—such as through LIDAR and color cameras arranged on the autonomous vehicle—for approaching vehicles. If the autonomous vehicle detects another vehicle approaching from behind, the autonomous vehicle can navigate out of the way of the other vehicle or exit the alley, navigate around the block, and return to and stop in the alley while waiting for the operator to complete the delivery rotation, thereby limiting total distance traveled and energy consumed by the autonomous vehicle during the delay routine.

In yet another implementation, the autonomous vehicle implements the foregoing methods and techniques to autonomously navigate away from and back to the dropoff location. However, if the autonomous vehicle detects an open parking space or unloading zone on a street or in a parking lot nearby, the autonomous vehicle can autonomously park itself in this parking space or loading zone. The autonomous vehicle can remain in this location while waiting for the operator to complete the delivery rotation, such as until recalled to the dropoff location manually by the operator or automatically by the remote computer system, as described above.

In another implementation, the autonomous vehicle double-parks in one lane of a multi-lane street at the dropoff location, such as by default or if an estimated away time is (significantly) less than an estimated minimum time to circle the adjacent block. While double-parked, the autonomous vehicle can: scan its surroundings—such as through LDIAR and color cameras arranged on the autonomous vehicle—to detect approaching vehicles and to characterize a density and speed of traffic passing the autonomous vehicle; and then transition to another navigation mode to move with traffic away from the dropoff location in order to reduce obstruction to traffic flow if certain traffic conditions are detected. For example, the autonomous vehicle can calculate a composite traffic metric as a function of local traffic density and local speed of traffic (e.g., traffic density divided by traffic speed); if the composite traffic metric exceeds a preset threshold value and the remaining away time for the delivery rotation exceeds an estimated time to circle the adjacent block, the autonomous vehicle can transition to another navigation mode described above to move with traffic, thereby opening the lane at the dropoff location and reducing obstruction to flow of traffic.

However, the autonomous vehicle can implement any other navigation modes during a delay routine.

1.7 Dropoff Location Change

In one variation, the operator or the remote computer system can prompt the autonomous vehicle to meet the operator at a pickup location different from the dropoff location. For example, the remote computer system can track locations of both the operator within the building and the autonomous vehicle nearby as the operator completes the delivery rotation. If the remote computer system determines that the operator and the autonomous vehicle are nearer a second known exit of the building than the original dropoff location as the delivery rotation nears completion, the remote computer system can: send the autonomous vehicle to a pickup location near this second exit; and send a notification—to the operator's mobile computing device—to meet the autonomous vehicle at the pickup location.

In another example, if current traffic conditions near the dropoff location hinder the autonomous vehicle's access to the dropoff location, the remote computer system can: confirm the operator's access to another known entry or exit of the building on a different street (e.g., behind the building or at a cross street); and reroute the operator and the autonomous vehicle to a pickup location adjacent this other entry or exit.

Alternatively, the operator can manually set an alternate pickup location, such as by dropping a pin at a desired pickup location within a digital map rendered within the native application on the operator's mobile computing device. However, the operator, remote computer system, and/or autonomous vehicle can adjust the pickup location in response to any other event or according to any other schema.

1.8 Return to Dropoff Location

Block S150 of the first method S100 recites, at the autonomous vehicle, in response to proximity of expiration of the away time, autonomously navigating back to the dropoff location; and Block S160 of the first method S100 recites, in response to the operator boarding the autonomous vehicle, autonomously navigating to a second dropoff location. Generally, as the remaining wait time approaches an estimated time for the autonomous vehicle to return to the dropoff location (or pickup location nearby), the remote computer system can serve a prompt to the autonomous vehicle to return to the dropoff location. The autonomous vehicle can then implement autonomous navigation techniques to autonomously navigate back to the dropoff location in Block S150. The operator or remote computer system can then select a next dropoff location, such as based on addresses of a next batch of packages scheduled to be delivered (or picked up) by the operator and dispatch the autonomous vehicle to this next dropoff location. The autonomous vehicle can then implement autonomous navigation techniques to autonomously navigate to this next dropoff location in Block S160, and the system can repeat Blocks of the first method S100 for this next dropoff location.

1.9 Multiple Operators

In one variation, the autonomous vehicle is occupied by a first operator and second operator. During operation, the autonomous vehicle implements the foregoing methods and techniques to: autonomously navigate to a first dropoff location where the first operator disembarks from the autonomous vehicle to complete a first delivery (and/or pickup) rotation; autonomously navigate to a second dropoff location—where the second operator disembarks from the autonomous vehicle to complete a second delivery (and/or pickup) rotation—while the first operator completes the first delivery rotation; and autonomously navigate back to the first dropoff location to collect the first operator while the second operator completes the second delivery rotation. The autonomous vehicle can also autonomously navigate to a third dropoff location where the first operator disembarks from the autonomous vehicle to complete a third delivery rotation before returning to the second dropoff location to collect the second operator while the first operator completes the third delivery rotation.

However, the system can implement any other methods or techniques to support multiple operators making multiple deliveries (and/or pickups) simultaneously at distinct locations.

1.10 External Control

In one variation in which the autonomous vehicle the double-parks in a street or temporarily parks in a loading zone or parking space while waiting for the operator to complete the delivery rotation, the remote computer system can provide remote control of the autonomous vehicle to another autonomous vehicle or human operator nearby (e.g., through a mobile computing device) to trigger the autonomous vehicle to move out of the street or out of its current parking space.

In one implementation, while double-parked in a street and while the estimated time to circle the adjacent block remains less than a remaining away time for the current delivery rotation, the autonomous vehicle can broadcast a wireless beacon that identifies the autonomous vehicle and availability of external control to move the autonomous vehicle out of the street. Other autonomous vehicles nearby may receive this wireless beacon; if another autonomous vehicle determines that the autonomous vehicle is obstructing its motion, the autonomous vehicle can automatically return a prompt to the autonomous vehicle to move out of the street. Upon receipt of this prompt, the autonomous vehicle can automatically transition into another navigation mode and autonomously execute a delay routine.

In another implementation, the autonomous vehicle can enter an open parking space or loading zone while executing a delay routine, as described above. Once parked, the autonomous vehicle can broadcast a wireless beacon indicating that the autonomous vehicle is temporarily parked and offering control to other autonomous vehicles to trigger the autonomous vehicle to leave its current parking space, as described above. Upon receipt of a request to move from the parking space and related information from another autonomous vehicle, the autonomous vehicle can transition to another navigation mode to autonomously move out of its parking space in deference for the other autonomous vehicle, such as if certain criteria are met (e.g., if the indicated or requested parking duration received from the other autonomous vehicle exceeds the remaining away time for the current delivery rotation). Therefore, the autonomous vehicle can indicate to other autonomous vehicles nearby that the autonomous vehicle is temporarily parked and then yield its parking space to another autonomous vehicle upon receipt of a request for the autonomous vehicle's parking space from the other autonomous vehicle, such as if the request from the other autonomous vehicle contains a set of parameters (e.g., requested parking duration, ownership of the parking space) that meet rules assigned to the autonomous vehicle.

In a similar implementation, the autonomous vehicle can render text, an icon, an animation, or another visual indicator—on one or more external displays (e.g., an LED LCD display, an LED array, a flip-disc display, an analog display) mounted to the front, rear, and/or sides of the autonomous vehicle—indicating availability of remote control to move the autonomous vehicle out of its current location, such as if the autonomous vehicle is double-parked or parked in a parking spot and the remaining away time for the current delivery rotation exceeds an estimated time to return to the dropoff location. For example, the autonomous vehicle can render—on its outwardly-facing, external display—a text messaging number and a prompt to text a code to the text messaging number to trigger the autonomous vehicle to move out of its current parking space. In this example, a user (e.g., a human rider or human operator) in another vehicle can thus text the number provided by the autonomous vehicle to request that the autonomous vehicle move out of its parking space. In a similar example, the autonomous vehicle can render—on its outwardly-facing display—a QR code; a user in another vehicle can scan the QR code with her mobile computing device to open an application in which the user may enter a request for the autonomous vehicle's parking space through the mobile computing device. In the foregoing examples, upon receipt of such a request from the user via the user's mobile computing device, the remote computer system can transmit a prompt to the autonomous vehicle to leave its current parking space and transition to another navigation mode, as described above.

However, the remote computer system and the autonomous vehicle can cooperate in any other way to provide intermittent remote control of the autonomous vehicle to an external entity (e.g., a human or other autonomous vehicle) during execution of a delay routine.

2. Second Method: Rideshare

Figure 2:
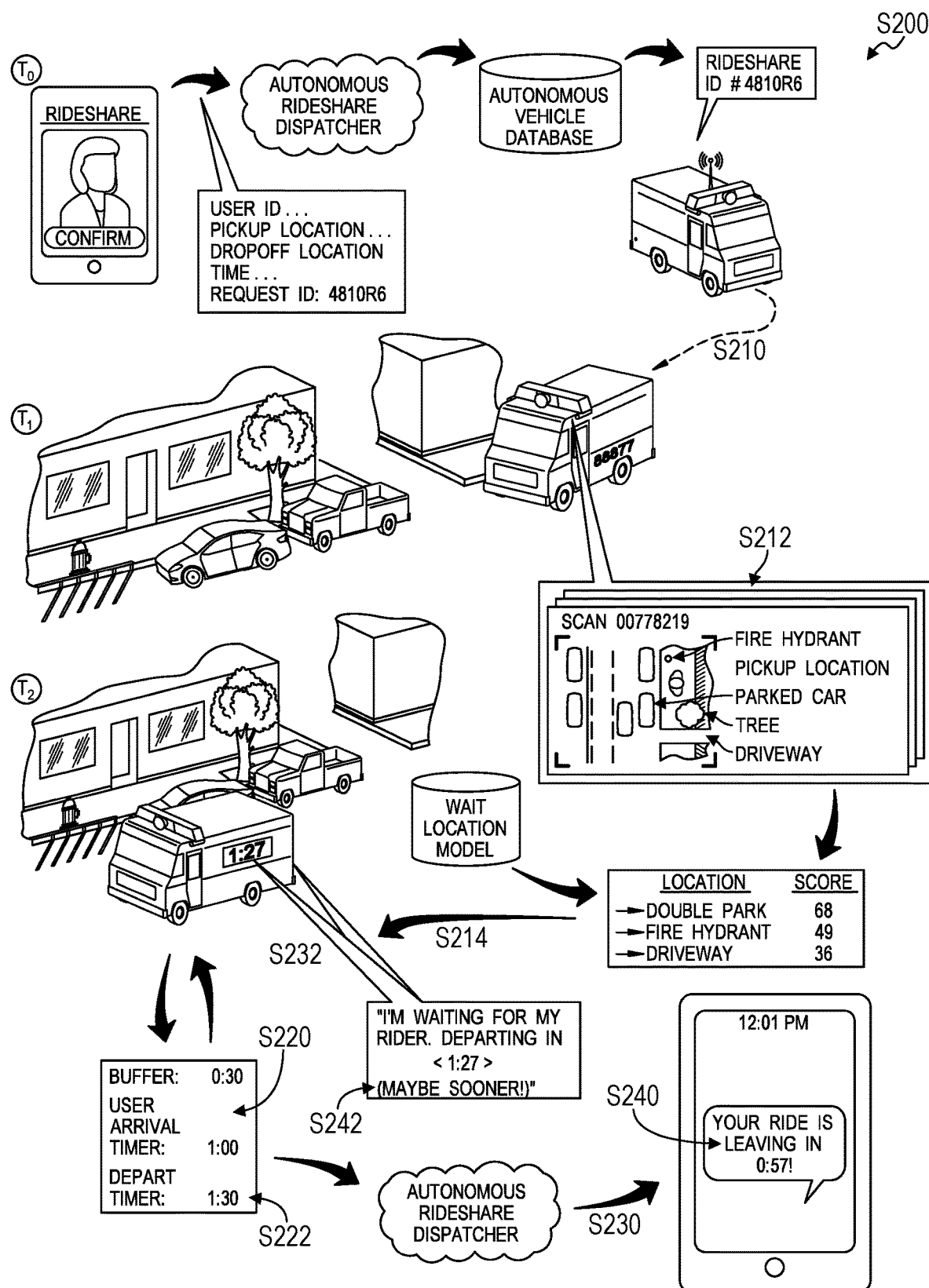
FIG. 2 is a flowchart representation of a second method.
Figure 4:
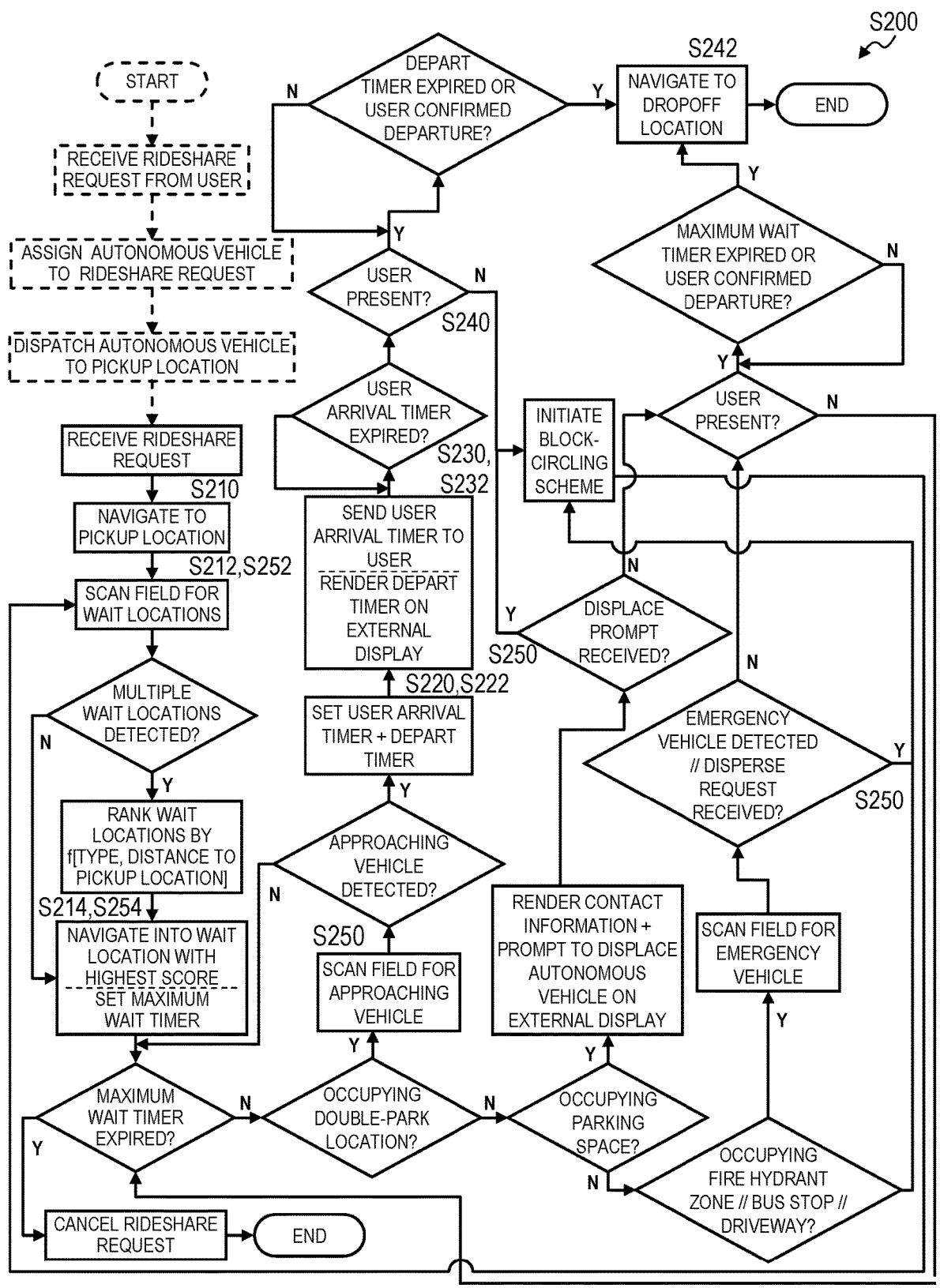
FIG. 4 is a flowchart representation of one variation of the second method.

As shown in FIGS. 2 and 4, a second method S200 for executing autonomous rideshare requests includes: at an autonomous vehicle, autonomously navigating to a pickup location specified in a rideshare request submitted by a user in Block S210; following first arrival of the autonomous vehicle proximal the pickup location, setting a user arrival timer for a first duration in Block S220 and setting a depart timer for a second duration exceeding the first duration by a buffer time in Block S222; serving a state of the user arrival timer to a mobile computing device affiliated with the user in Block S230; at the autonomous vehicle, rendering a state of the depart timer on an external display arranged on the autonomous vehicle in Block S232; in response to failure of the user to arrive at the autonomous vehicle prior to expiration of the user arrival timer, departing from the pickup location without the user in response to expiration of the user arrival timer in Block S240; and, in response to the user arriving at the autonomous vehicle prior to expiration of the user arrival timer, departing from the pickup location with the user prior to expiration of the delay timer in Block S242.

Figure 3:
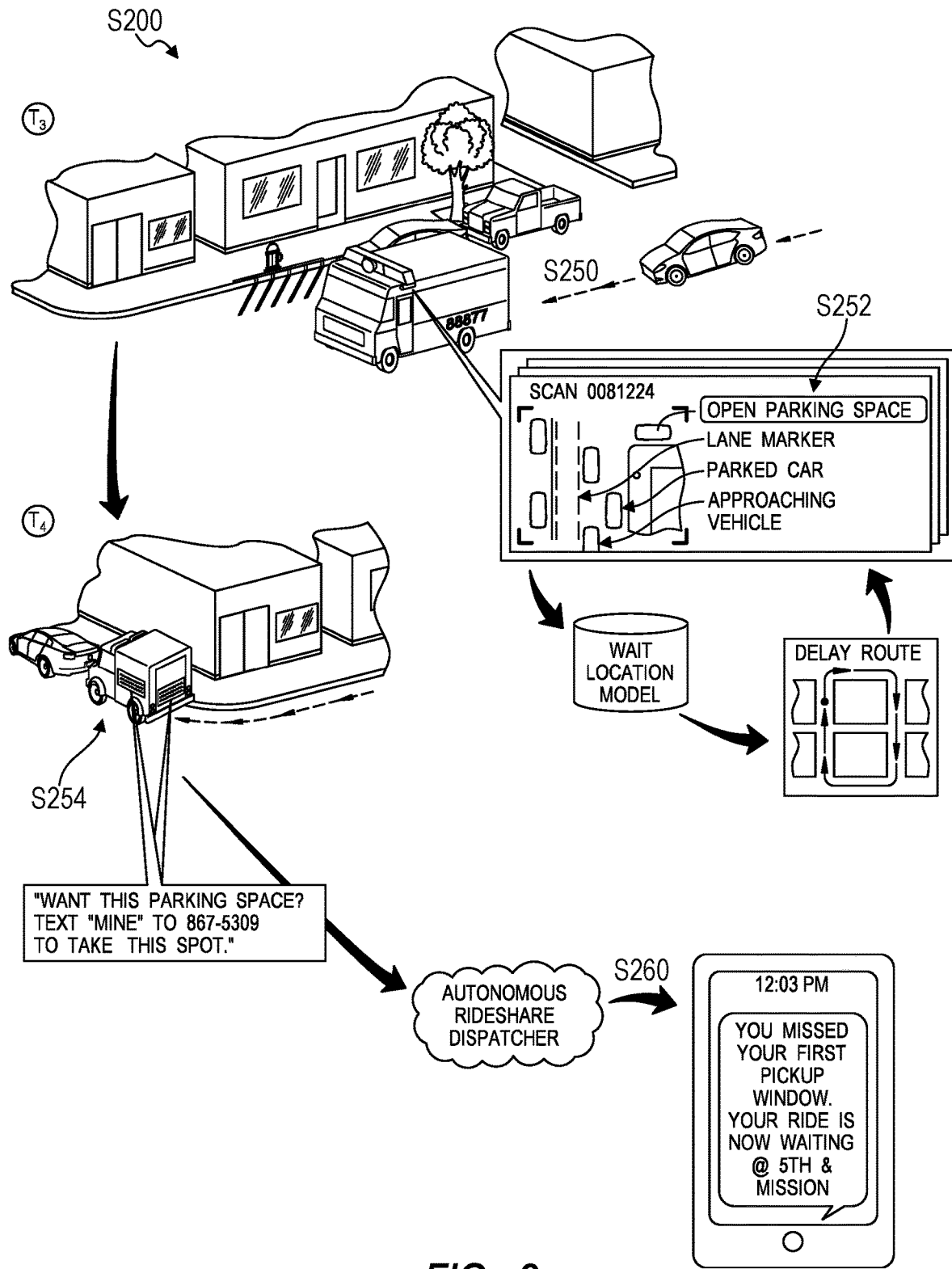
FIG. 3 is a flowchart representation of one variation of the second method.

One variation of the second method S200 shown in FIGS. 2 and 3 includes, at an autonomous vehicle: autonomously navigating to a pickup location specified in a rideshare request submitted by a user in Block S210; in response to arriving proximal the pickup location, recording a first sequence of scan data (e.g., optical images) of a field around the autonomous vehicle in Block S212; scanning the first sequence of scan data for a first wait location proximal the pickup location in Block S212; and in response to detecting the first wait location, autonomously navigating into the first wait location in Block S214. This variation of the second method S200 also includes, in response to detecting a trigger condition while in the first wait location at the autonomous vehicle: autonomously exiting the first wait location in Block S250; autonomously navigating downroad of the pickup location in Block S250; recording a second sequence of scan data of the field around the autonomous vehicle in Block S252; scanning the second sequence of scan data for a second wait location downroad of the pickup location in Block S252; and, in response to detecting the second wait location, autonomously navigating into the second wait location in Block S254. This variation of the second method S200 further includes, in response to the autonomous vehicle entering the second wait location, transmitting a notification to the mobile computing device, the notification indicating a geospatial location of the second wait location and a prompt to meet the autonomous vehicle at the second wait location in place of the pickup location in Block S260.

2.1 Applications

Generally, Blocks of the second method S200 can be executed by an autonomous vehicle while navigating to a pickup location to collect a user (e.g., a "rider") in order to limit obstruction of vehicle traffic nearby. In particular, the autonomous vehicle can execute Blocks of the second method S200—such as in conjunction with a remote computer system (e.g., an autonomous vehicle fleet manager, a remote rideshare dispatcher)—to elect various wait locations at or near a pickup location specified by a user, to monitor trigger conditions and/or internal timers, and to selectively move to different wait locations and/or transition into circling a block around the pickup location in order to minimize obstruction to local traffic, yield a parking space to another vehicle or vehicle operator, prevent obstruction to a fire hydrant or fire lane, reduce obstruction to cyclists, etc. The autonomous vehicle can thus execute Blocks of the second method S200 to limit frustration and anxiety that an autonomous vehicle—stopped in a road, parking space, bike lane, driveway, etc.—may present for vehicle operators, cyclists, pedestrians, emergency vehicles etc. nearby.

In one example, the autonomous vehicle executes Blocks of the second method S200 to: autonomously navigate toward a pickup location designated by a user in a pending rideshare request; to set a user arrival timer limiting a duration of time that the autonomous vehicle will wait for the user to arrive at the autonomous vehicle; to share the state of the user arrival timer with the user via the user's mobile computing device (e.g., a smartphone, a tablet) in order to inform the user of when she must arrive at the autonomous vehicle to prevent the autonomous vehicle from departing prior to her arrival; to set a depart timer of duration greater than the user arrival timer; and to render this depart timer on an external display on the autonomous vehicle in order to inform other vehicle operators, cyclists, and pedestrians, etc. nearby of the maximum duration that the autonomous vehicle intends to remain in its current location. In particular, by setting a depart timer that is longer than the user arrival timer by a buffer timer and activating these timers upon arrival at the pickup location (or upon approach of another vehicle after the alignment feature arrives at the pickup location), the autonomous vehicle can enable the user to arrive at the autonomous vehicle before expiration of the user arrival timer, enter the autonomous vehicle, and prepare for departure before expiration of the depart timer, thereby meeting expectations originally set by the autonomous vehicle when rendering the depart timer of the external display. However, the autonomous vehicle can also depart from the pickup location if the user enters the autonomous vehicle and is prepared for departure ahead of this schedule. Furthermore, if the user fails to arrive at the autonomous vehicle prior to expiration of the user arrival timer, the autonomous vehicle can depart from the pickup location and: move to another wait location downroad of the pickup location while waiting for the user to arrive at this alternative pickup location; autonomously circle the block and return to the original pickup location; or transition into executing delay schema in order to reduce obstruction to traffic flow nearby while the autonomous vehicle waits for the user to arrive at the pickup location before returning to collect the user.

In another example, the autonomous vehicle executes Blocks of the second method S200 to: autonomously navigate toward a pickup location designated by a user in a pending rideshare request; to select a wait location near the pickup location, such as a parking space, a bike lane, a fire hydrant zone, a driveway, or a double-park location; and to monitor the field around the autonomous vehicle for trigger conditions, such as another vehicle requesting the parking space, an approaching cyclist, a approaching emergency response vehicle, or another approaching vehicle. Upon detecting such a trigger condition and considering various other factors (e.g., cyclist distance from the autonomous vehicle), the autonomous vehicle can automatically move to another wait location or execute a block-circling scheme to navigate around the block and return to the current wait location, thereby yielding to these other vehicles and vehicle operators while limiting inconvenience to a user waiting to enter the autonomous vehicle.

Therefore, the autonomous vehicle can implement Blocks of the second method S200 in order to limit obstruction to traffic flow, inconvenience to operators of other vehicles nearby, and to a user while executing a rideshare request for this user.

2.2 Rideshare Request and Autonomous Vehicle Dispatch

As shown in FIGS. 2 and 3, a user can initiate a rideshare request at a native rideshare application executing on her mobile computing device. For example, the user can navigate to the native rideshare application from a home screen on her mobile computing device and then: select a type of ground transportation (e.g., a vehicle size, a carpool); enter a pickup location and a dropoff location (e.g., by dropping "pins" on a digital map or by entering addresses of these pickup and dropoff locations); select a payment option; and then confirm the rideshare request within the native rideshare application. Upon receipt of this rideshare request, the remote computer system can: identify an autonomous vehicle that is near the selected pickup location, currently unoccupied, and/or completing a rideshare cycle at a dropoff location nearby; assign this rideshare request to this autonomous vehicle; and dispatch the autonomous vehicle to execute a next rideshare cycle according to this rideshare request, including navigating to the pickup location specified in this rideshare request.

The remote computer system or the autonomous vehicle can then calculate a route from the autonomous vehicle's current location to the pickup location specified by the user, and the autonomous vehicle can then implement autonomous navigation techniques to navigate along this route toward the pickup location.

2.3 Wait Location Near Pickup Location

As shown in FIGS. 2 and 4, as the autonomous vehicle approaches the pickup location, the autonomous vehicle can scan the field around the autonomous vehicle for a viable wait location in which the autonomous vehicle may stop—substantially out of the flow of local traffic—while waiting for the user to arrive at the pickup location. In particular, upon navigating up to or near (e.g., within 50 meters of) the pickup location, the autonomous vehicle scans the field around the autonomous vehicle for a loading zone, a street parking space, an opening in a series of other vehicles parked on the shoulder of the road, a bike lane, a bus stop or bus lane, an emergency lane, a fire hydrant zone, a driveway, a parking lot, or other street surface accessible to the autonomous vehicle and out of the flow of traffic (hereinafter a "wait location").

In one implementation, the autonomous vehicle stores a localization map containing layers representing geolocations or georeferenced boundaries of known loading zones, parking spaces, bike lanes, bus stops and bus lanes, emergency lanes, fire hydrant zones, driveway, parking lots, and/or other possible wait locations within the geographic region in which the autonomous vehicle is deployed. In preparation for arriving at the pickup location, the autonomous vehicle can query the localization map for possible wait locations near the pickup location, such as a set of possible wait locations that are: on the same side of the street as the pickup location; on the same block as the pickup location; and/or within a threshold distance (e.g., twenty meters in a suburban setting, ten meters in an urban setting) of the pickup location.

As the autonomous vehicle nears the pickup location, the autonomous vehicle can then: record an optical scan of the field around the autonomous vehicle; detect a set of features in this optical scan; calculate a transform that aligns a subset of these features to like features represented in the localization map; calculate the autonomous vehicle's geospatial location and orientation based on this transform; implement artificial intelligence and computer vision techniques to interpret another subset of these features as vehicles and pedestrians in locations intersecting these possible wait locations (and/or vehicles and pedestrians approaching these possible wait locations with a perceived intent to occupy these possible wait locations), such as described below; and then flag a subset of these wait locations that are currently unoccupied as viable wait locations. The autonomous vehicle can regularly repeat this process in order to track states of these possible wait locations over time as the autonomous vehicle approaches the pickup location, such as at a rate of 20 Hz. If the autonomous vehicle identifies a single viable wait location near the pickup location, the autonomous vehicle can autonomously navigate to this wait location.

Alternatively, if the autonomous vehicle thus detects multiple viable wait locations near the pickup location, the autonomous vehicle can score these wait locations, elect a highest-scored wait location, and autonomously navigate into this wait location to wait for the user. For example, the autonomous vehicle can: rank a street parking space first, followed by a loading zone, then a fire hydrant zone, an emergency lane, a bike lane, a bus stop, a bus lane, and then a driveway; and score these wait locations by rank and weighted by distance from the pickup location specified by the user. In this example, the autonomous vehicle can thus score a fire hydrant zone that is within two meters of the pickup location specified by the user higher than an open street parking space twenty meters from this pickup location and thus elect to wait for the user in the fire hydrant zone accordingly. Similarly, the autonomous vehicle can score a driveway that intersects the pickup location higher than a bus lane ten meters from the pickup location and thus elect to wait for the user in the driveway.

After thus identifying and electing a wait location near the pickup location, the autonomous vehicle can autonomously navigate into this wait location and remain while awaiting the user's arrival. The autonomous vehicle (or the remote computer system) can also transmit a notification—such as in the form of an SMS text message or in-application notification indicating the autonomous vehicle presence at a specific geolocation near the pickup location—to the user's mobile computing device, such as once the autonomous vehicle elects or navigates into this wait location.

2.3.1 Exiting the Wait Location

Upon entering an elected wait location, the autonomous vehicle (or the remote computer system) can transmit a notification indicating the autonomous vehicle's location near the pickup location to the user's mobile computing device. The autonomous vehicle can also enable select triggers for autonomously exiting this wait location—responsive to external or implicit stimuli—based on the type of the wait location now occupied by the autonomous vehicle, such as described below, as shown in FIGS. 2, 3, and 4.

In one example, if the autonomous vehicle elects to wait in a loading zone near the pickup location, the autonomous vehicle can: implement artificial intelligence and computer vision techniques to scan its surrounding field for an approaching vehicle (e.g., a truck, a van) or for another vehicle stopped just behind the autonomous vehicle; and then autonomously navigate to a different wait location (e.g., with a next-highest score) or double-park on the street nearby in response to detecting such a vehicle, thereby ceding the loading zone to this other vehicle. In a similar example, if the autonomous vehicle elects to wait in a bike lane, the autonomous vehicle can: implement artificial intelligence and computer vision techniques to scan the field around the autonomous vehicle for a cyclist approaching from the same bike lane occupied by the autonomous vehicle; and then autonomously navigate out of the bike lane and into a different wait location nearby in response to detecting such a cyclist, thereby ceding the bike lane to the cyclist, such as described below. In another example, if the autonomous vehicle elects to wait in a street parking space, the autonomous vehicle can: communicate an option—on an external display—to displace the autonomous vehicle from its current parking space, as described below; and then autonomously navigate to a different wait location nearby in response to receipt of a command to cede the parking space, such as from a second vehicle, a mobile computing device of another vehicle operator, or the remote computer system, such as described above.

In the foregoing examples, the autonomous vehicle (or the remote computer system) can also track: the geospatial location of the user's mobile computing device, estimate the user's time of arrival at the autonomous vehicle's current location, and immediately navigate out of the wait location responsive to a trigger condition associated with the wait location if the user's estimated time of arrival is greater than a threshold duration (e.g., 30 seconds). However, if the user's estimated time of arrival is less than the threshold duration, the autonomous vehicle can implement methods and techniques described below to: set a depart timer for a duration of time corresponding to the user's estimated time of arrival (plus a buffer time, such as 30 seconds); render the depart timer and a notice that the autonomous vehicle will depart at the expiration of the delay timer on an external display mounted on the autonomous vehicle; and then exit the wait location at the earlier of expiration of the delay timer and confirmation to depart submitted by the user after entering the autonomous vehicle.

In another example, if the autonomous vehicle elects to wait in an emergency lane or a fire hydrant zone, the autonomous vehicle can scan its surrounding field for approaching emergency vehicles; and then autonomously navigate out of the emergency lane or a fire hydrant zone and away from the pickup location after detecting an approaching emergency vehicle. The autonomous vehicle can also navigate out of the emergency lane or a fire hydrant zone immediately after receipt of a command broadcast wirelessly by a nearby emergency vehicle or upon receipt of a command from an emergency dispatcher specifying an emergency event in a geospatial location near the autonomous vehicle. The autonomous vehicle can thus immediately respond to presence of an emergency vehicle or emergency event nearby by exiting the emergency lane or a fire hydrant zone in order to limit obstruction for the approaching emergency vehicle.

Therefore, the autonomous vehicle can remain stopped in a wait location until the autonomous vehicle detects a trigger condition, such as based on a type of the wait location elected by the autonomous vehicle. In response to detecting such a trigger condition, the autonomous vehicle can then: autonomously navigate to a double-park location near the pickup location if conditions described below are met; autonomously navigate to a different wait location if the autonomous vehicle detects such a viable wait location near the pickup location; or transition into executing a delay schema—such as a block-circling schema followed by entering a parking space, a fire hydrant zone, or a bus zone remote from the pickup location while waiting for the user to arrive at the pickup location—as described below.

2.4 Double-Parking Near Pickup Location

As shown in FIGS. 2 and 4, the autonomous vehicle can also elect to double-park at the pickup location while awaiting the user's arrival, such as: if the autonomous vehicle fails to identify a viable wait location out of the flow of traffic detected within the threshold distance of the pickup location; if the highest-scored wait location thus calculated by the autonomous vehicle is less than a threshold score; and/or if the autonomous vehicle detects less than a threshold vehicle traffic density near the pickup location (e.g., a threshold traffic density inversely proportional to a number of street lanes and/or to an average vehicle speed near the pickup location). Alternatively, the autonomous vehicle can elect to double-park at the pickup location by default unless the autonomous vehicle detects certain conditions near the pickup location, such as if traffic density around the pickup location exceeds a threshold density or if an open parking space, fire hydrant zone, or driveway is available within a threshold distance (e.g., five meters) of the pickup location.

In this implementation, after electing to double-park at the pickup location while waiting for the user, the autonomous vehicle can autonomously navigate into a double-park position adjacent another parked vehicle at the pickup location, such as with a passenger door of the autonomous vehicle offset slightly ahead of the front of this other vehicle or slightly behind the rear of this other vehicle in order to enable the user to easily access this passenger door. Once double-parked at the pickup location, the autonomous vehicle (or the remote computer system) can transmit a notification or otherwise communicate with the native rideshare application executing on the user's mobile computing device to communicate the specific geolocation of the autonomous vehicle near the pickup location to the user.

2.4.1 Exiting the Double-Park Location

As shown in FIGS. 2 and 4, upon entering this double-parked position, the autonomous vehicle can enable select triggers for autonomously exiting this double-parked position responsive to external or implicit stimuli. In one implementation, upon double-parking at the pickup location, the autonomous vehicle can: set a user arrival timer for a preset duration of time (e.g., 60 seconds); set a depart timer for a maximum double-park duration greater than the user arrival timer (e.g., 90 seconds, such as according to a preset buffer time of 30 seconds in order to allow a user time to enter and settle in the autonomous vehicle before departure); render the state of the depart timer on an external display on the autonomous vehicle; and render a notice—on the external display—that the autonomous vehicle intends to depart from its location at the expiration of the timer or sooner. For example, the autonomous vehicle (or the remote computer system) can set buffer durations of: 30 seconds if the rideshare request indicates no additional passenger and no luggage; 45 seconds if the rideshare request indicates at least one additional passenger but no luggage; 60 seconds if the rideshare request indicates that the user is carrying luggage; and 75 seconds if the rideshare request indicates that the user is accompanied by at least one small child. In this implementation, the autonomous vehicle can thus indicate to other vehicles, vehicle operators, and pedestrian nearby when the autonomous vehicle intends to leave its current double-parked location.

In this implementation, the autonomous vehicle (or the remote computer system) can also transmit the state of a notification—to the user's mobile computing device, such as in the form of an SMS text message or in-application notification—including: the time remaining on the user arrival timer; and a notice that the autonomous vehicle will depart from the pickup location upon expiration of the depart timer, which may require the user to meet the autonomous vehicle at an alternate pickup location or wait for the autonomous vehicle to circle the block before returning to the user-elected pickup location. Alternatively, the autonomous vehicle (or the remote computer system) can synchronize a timer rendered within a native rideshare application executing on the user's mobile computing device to the user arrival timer, and the native rideshare application can render a notice that the autonomous vehicle will depart upon expiration of this timer.

Thus, if the user arrives at the autonomous vehicle prior to expiration of the user arrival timer, the autonomous vehicle can remain at the pickup location as the user settles into the autonomous vehicle and prepares for departure, such as up to expiration of the depart timer. However, if the user fails to arrive at the autonomous vehicle prior to expiration of the user arrival timer (or prior to expiration of the depart timer), the autonomous vehicle can immediately exit its current double-park location. For example, the autonomous vehicle can: navigate forward out of its current double-park location; implement methods and techniques described above to detect a wait location (e.g., a parking space, a fire hydrant zone) near the pickup location; autonomously navigate into this wait location to wait for the user; and transmit a notification—to the user's mobile computing device—indicating the location of the wait location now occupied by the autonomous vehicle. The autonomous vehicle can then implement methods and techniques described above to depart from the wait location responsive to a corresponding trigger condition or upon the user's entry into the autonomous vehicle. Alternatively, if the user fails to arrive at the autonomous vehicle prior to expiration of the user arrival timer, the autonomous vehicle can: transition into executing a delay schema described below to circle the block around the pickup location; estimate a next time of arrival of the autonomous vehicle at the pickup location based on local traffic conditions; and transmit a notification to the user's mobile computing device or otherwise synchronize with the native rideshare application executing on the user's mobile computing device to indicate this new estimated time of arrival to the user. The autonomous vehicle can then repeat the foregoing process to double-park at the pickup location for up to the maximum double-park duration or to park in a wait location nearby, as described above.

In the foregoing implementation, the autonomous vehicle can set the depart timer automatically upon arrival at the pickup location. Alternatively, the autonomous vehicle can selectively set the depart timer responsive to a local traffic condition or responsive to an approaching vehicle slowing (or stopping) behind the autonomous vehicle. For example, upon entering the double-park location, the autonomous vehicle can scan its surrounding field for other vehicles approaching from the rear of the autonomous vehicle. If the autonomous vehicle thus detects a) another vehicle approaching the rear of the autonomous vehicle, occupying the same lane as the autonomous vehicle, and slowing (or stopping) behind the autonomous vehicle, b) an increase in traffic density nearby, or c) increased congestion nearby, the autonomous vehicle can set the depart timer and a corresponding user arrival timer; render the depart timer on the external display; serve the state of the user arrival timer to the user's mobile computing device and a prompt to enter the vehicle before expiration of the user arrival timer; and prepare to exit the double-park location if the user fails to arrive at the pickup location before expiration of the user arrival timer (or before expiration of the depart timer).

In the foregoing implementation, upon arriving at the pickup location, the autonomous vehicle (or the remote computer system) can also: query the user's mobile computing device for its geolocation; and estimate time of arrival of the user at the autonomous vehicle's location based on the geolocation of the user's mobile computing device, the location of the autonomous vehicle, and a typical human walking speed. If the user's estimated time of arrival exceeds a threshold duration (e.g., 60 seconds), the autonomous vehicle can autonomously navigate out of the double-park location and either: detect and navigate into a viable wait location nearby, as described above; or transition into executing a delay schema, as described below. However, if the user's estimated time of arrival is less than the threshold duration, the autonomous vehicle can remain in its current double-park location and execute the foregoing methods and techniques to set and render a depart timer automatically or in response to a changing local traffic condition while waiting for the user to arrive.

Similarly, if the user arrival timer has expired or is nearing expiration and the user has not yet entered the autonomous vehicle, the autonomous vehicle (or the remote computer system) can: check the location of the user's mobile computing device and/or estimate the time of the user's arrival at the autonomous vehicle; and remain at double-parked at the pickup location even after the user arrival timer expires if the user is within a threshold distance (e.g., twenty meters in a suburban setting, ten meters in an urban setting) or a threshold time (e.g, five seconds) of the autonomous vehicle, thereby reducing possibility that the autonomous vehicle departs from the pickup location just as the user arrives to enter the autonomous vehicle. However, the autonomous vehicle can depart from the double-parked location once the user arrival timer expires—and before the depart timer expires—if the user is still outside of the threshold distance or threshold time of the autonomous vehicle. While waiting at the double-park location, the autonomous vehicle can additionally or alternatively scan the field around the autonomous vehicle for a pedestrian approaching the autonomous vehicle, identify the pedestrian as the user (e.g., by implementing facial identification techniques or by interpreting an intent to enter the autonomous vehicle from the pedestrian's motion), and remain stopped at the double-park location even after the user arrival timer expires in order to wait for the user—currently approaching the autonomous vehicle—to enter the autonomous vehicle. (When occupying a wait location as described above, the autonomous vehicle can implement similar methods and techniques to delay departure from the wait location after a trigger condition to exit the wait location is received or detected.)

Therefore, in the foregoing implementations, the autonomous vehicle can limit an amount of time that the autonomous vehicle remains double-parked in order to both limit its effect on local traffic conditions, improve acceptance of the autonomous vehicle for other vehicle operators and pedestrians nearby, and maintain high temporal and energy efficiency over the course of several rideshare cycles executed by the autonomous vehicle. The autonomous vehicle can also implement the foregoing methods and techniques to visually communicate its intent to exit a double-park location to both the user and to other vehicle operators and pedestrians nearby, which may improve trust and reduce anxiety related to the autonomous vehicle for these operators and pedestrians. The autonomous vehicle can implement similar methods and techniques when stopped in a wait location, such as described above.

Furthermore, upon entering a wait location, double-parking at the pickup location, or otherwise arriving at the pickup location, the autonomous vehicle can set a maximum wait timer, such as for a duration of two minutes. In response to this maximum wait timer expiring, the autonomous vehicle can: execute a delay schema to navigate away from the pickup location, as described below, before returning to the pickup location to collect the user; or cancel the current rideshare request from the user and autonomously navigate to a pickup location specified in a next rideshare request submitted by a different user.

2.5 Delay Schema

As described above, the autonomous vehicle can navigate to the pickup location and wait at the pickup location for the user by default, such as by: double-parking at the pickup location; or stopping in a bike or fire lane, occupying a loading zone, or entering a roadside parking space near the pickup location, as described above. However, in response to detecting a trigger condition, in response to receiving a command from an external entity to exit the double-park location or wait location, or in response to the user failing to enter the autonomous vehicle prior to expiration of a user arrival or depart time, the autonomous vehicle can exit the double-park location or wait location and initiate delay schema. In particular, the autonomous vehicle can automatically navigate out of its double-park location or wait location in order to limit obstruction of traffic near the pickup location and/or to yield to another vehicle or vehicle operator, such as: a vehicle operator desiring the autonomous vehicle's parking space; a vehicle operator desiring a loading zone occupied by the autonomous vehicle; a vehicle operator requiring access to a driveway blocked by the autonomous vehicle; or an emergency responder requiring access to an emergency lane or fire hydrant blocked by the autonomous vehicle.

2.5.1 Block-Circling Scheme

In one implementation, upon exiting a double-park location or wait location, the autonomous vehicle defaults to a block-circling scheme, such as including autonomously navigating along streets and alleys around the designated pickup location as described above.

While autonomously traversing these streets around the pickup location, the autonomous vehicle can also regularly scan the field around the autonomous vehicle and implement artificial intelligence, computer vision, and/or other tools and techniques to detect pedestrians, other vehicles, roadwork, and/or other fixed and mobile objects near the autonomous vehicle. The autonomous vehicle (or the remote computer system) can then leverage these data: to monitor real-time vehicle and pedestrian traffic, accidents, emergency vehicles, buses, etc. along streets and alleys around the pickup location; and to regularly recalculate an estimated time (or time window) of arrival of the autonomous vehicle back to the pickup location.

As the autonomous vehicle autonomously navigates streets and alleys around the pickup location according to the block-circling scheme, the autonomous vehicle can also scan the field around the autonomous vehicle for an open parking space, an open bus stop, a open length of curb, a bike lane, an open driveway, or other waiting area near the pickup location and sufficiently isolated from the flow of traffic nearby. Upon detecting such a waiting area, the autonomous vehicle can autonomously navigate into this waiting area. The autonomous vehicle can remain in this waiting area: until the user manually calls the autonomous vehicle to the pickup location; until the user's mobile computing device enters a geofenced location around the pickup location; until the user's estimated time of arrival at the pickup location falls within a threshold difference of the estimated time for the autonomous vehicle to return to the pickup location; until another entity (e.g., an operator in another vehicle, a cyclist, a bus, a emergency vehicle, or an emergency dispatcher, etc.) implicitly or explicitly triggers the autonomous vehicle to move out of this waiting area; or responsive to another displace trigger, such as described below.

2.5.2 Parking Space Delay Scheme

While autonomously executing the block-circling scheme described above, the autonomous vehicle can scan the field around the autonomous vehicle for an open parking space in which to wait for the user. In one implementation shown in FIGS. 3 and 4, while executing the block-circling scheme, the autonomous vehicle can implement computer vision techniques (e.g., a parking space model and a vehicle model): to detect lane markers; to interpret a set of lane markers—perpendicular to traffic flow—as a parking space; and to determine that this parking space is unoccupied based on absence of another visual element intersecting an area or volume containing this parking space. Alternatively, the autonomous vehicle can: detect an opening in a row of vehicles parked along the shoulder of a road; detect lane markings adjacent this opening of vehicles; implement a parking space model to determine whether these lane markings correspond to a parking space; and then elect to park in this parking space accordingly.

Additionally or alternatively, the localization map (or a navigation map) loaded onto the autonomous vehicle can include a parking space layer defining geolocations or georeferenced boundaries around known parking spaces within the geographic region in which the autonomous vehicle is deployed. While executing the block-circling scheme described above, the autonomous vehicle can: regularly record an optical scan of the field around the autonomous vehicle, such as at a rate of 20 Hz; compare these optical scans to the localization map in order to determine the geospatial location and orientation of the autonomous vehicle; and then isolate a set of known parking spaces in the vicinity of the autonomous vehicle based georeferenced parking spaces identified in the localization map. The autonomous vehicle can then: implement artificial intelligence, a vehicle model, and/or other computer vision techniques or tools to: detect other vehicles in this optical scan; align these detected vehicles to these known parking spaces in order to isolate a subset of these parking spaces that are empty; and then to elect a particular parking space from this subset of empty parking spaces. However, the autonomous vehicle can implement any other method or technique to detect and elect an empty (e.g., available, unoccupied) parking space near (e.g., within six blocks, within a two-minute drive) the designated pickup location.

After electing a parking space, the autonomous vehicle can autonomously navigate into this empty parking space and remain in this parking space until the autonomous vehicle detects and receives a displace trigger from another vehicle nearby or until the user arrives at or approaches the pickup location (e.g., as determined by the remote computer system tracking the user's mobile computing device), at which time the autonomous vehicle can autonomously navigate back to the pickup location.

In this variation, the autonomous vehicle can also: implement computer vision techniques (e.g., object recognition, optical character recognition) to: detect a parking meter adjacent the parking space; read a state of the parking meter (e.g., whether the parking meter is currently expired); and read an identifier from the parking meter, such as in the form of a barcode, a quick-response code, or a serial number. Alternatively, in the implementation described above in which the autonomous vehicle implements a localization map (or a navigation map) with a parking space layer to identify parking spaces within the geographic region, the autonomous vehicle can query the localization map for an identifier of the parking meter. The autonomous vehicle or the remote computer system can then automatically remit payment for the parking space based on the identifier of the parking meter. In one example, the remote computer system can remit payment to the meter for two-minute intervals until the autonomous vehicle departs from the parking space. Alternatively, the autonomous vehicle can estimate a time of arrival (from its current position in the parking space) to the designated pickup location specified by the user and estimate a dwell duration based on a difference between this estimated time of arrival and a target pickup time specified by the user; the remote computer system can then automatically remit payment for the parking space for this dwell duration.

Similarly, an autonomous vehicle fleet manager associated with the autonomous vehicle may contract access to short-term (e.g., up to fifteen-minute) parking in a parking lot managed by a local business, such as a grocery store or strip mall. While executing a block-circling routine, the autonomous vehicle can: autonomously navigate to this parking lot; scan the parking lot for vehicle traffic or vehicle density (e.g., a ratio of vehicles present to total parking spaces in the parking lot); and then autonomously navigate into the parking lot and enter an available parking space if the vehicle traffic or vehicle density is less than a threshold value. (The remote computer system can remit payment to the local business for this parking space, such as based on a duration of time that the autonomous vehicle remains in the parking space.)

When parked in a parking space while waiting for the user to arrive at the pickup location, the autonomous vehicle can also enable tools for other vehicle operators to displace the autonomous vehicle from its parking space. For example, and as described above, the autonomous vehicle can render on its external display: a notice that the parking space occupied by the autonomous vehicle is available; an SMS text number; and a prompt to trigger the autonomous vehicle to exit the parking space by sending a test message to the SMS text number. Alternatively, the autonomous vehicle can render: a barcode, quick-response code, or other visual fiducial; and a prompt to scan the visual fiducial through an instance of the native rideshare application executing on a vehicle operator's mobile computing device in order to trigger the autonomous vehicle to leave the parking space. (In this example, the autonomous vehicle can thus incentivize other vehicle operators to load the native rideshare application onto their mobile computing devices in order to access remote control of the autonomous vehicle and thus access the autonomous vehicle's current parking space.) Upon receipt of a SMS text message at the SMS text number rendered on the autonomous vehicle or in response to receipt of a scan of the visual fiducial rendered on the autonomous vehicle's external display, the remote computer system can transmit a command to the autonomous vehicle to exit the parking space and resume other delay schema. However, in this implementation, the autonomous vehicle and/or the remote computer system can enable another vehicle operator to displace the autonomous vehicle from its parking space in any other way, and the autonomous vehicle can render any other prompt or content on its external display accordingly.

The autonomous vehicle can implement similar methods and techniques: to identify, elect, and autonomously enter an empty parking space adjacent the pickup location; and to selectively exit this parking space responsive to a request from another vehicle operator nearby. The autonomous vehicle can also elect to wait for the user in a parking space uproad of the pickup location prior to first arriving at the pickup location and can implement similar methods and techniques to identify an open parking space up to three blocks ahead of the pickup location, enter this parking space, and selectively exit this parking space upon receipt of a command to exit the parking space from another vehicle operator or in response to the user arriving at or near the pickup location (e.g., as monitored by the remote computer system).

2.5.3 Bike Lane Delay Scheme

While autonomously executing the block-circling scheme described above, the autonomous vehicle can additionally or alternatively scan the field around the autonomous vehicle for a bike lane in which to wait for the user. In one implementation shown in FIG. 4, while executing the block-circling scheme, the autonomous vehicle can implement computer vision techniques (e.g., a bike lane model): to detect lane markers and to interpret a set of lane markers—parallel to traffic flow—as a bike lane. Additionally or alternatively, the localization map (or a navigation map)—loaded onto the autonomous vehicle—can include a bike lane layer defining geolocations or georeferenced boundaries around known bike lanes within the geographic region in which the autonomous vehicle is deployed.

Upon detecting a bike lane in the field near the autonomous vehicle and/or approaching a bike lane indicated in the localization map, the autonomous vehicle can scan its surrounding field for cyclists, pedestrians, and other vehicles that may be approaching or occupying the bike lane. If the autonomous vehicle thus confirms that no cyclists are currently approaching the autonomous vehicle's location via the bike lane (e.g., up to 200 meters behind the autonomous vehicle) and that the adjacent segment of the bike lane is unoccupied, the autonomous vehicle can autonomously navigate into the bike lane and remain in this location while awaiting a displace trigger or a prompt from the remote computer system to return to the pickup location.

While waiting in the bike lane, the autonomous vehicle can regularly scan the field behind (and ahead of) the autonomous vehicle for an approaching cyclist. Upon detecting an approaching cyclist, the autonomous vehicle can: estimate the cyclist's speed based on change in the cyclist's location over a series of scan cycles; estimate the cyclist's time of arrival at the autonomous vehicle's location based on the cyclist's current speed and location; and estimate duration of time necessary for the autonomous vehicle to exit the bike lane (e.g., based on local traffic conditions and a density and speed of other vehicles passing the autonomous vehicle). If this duration of time is more than the cyclist's estimated time of arrival at the autonomous vehicle's current location, the autonomous vehicle can remain in the bike lane or move further toward an adjacent curb (i.e., further into the bike lane) in order to provide the cyclist more space between the autonomous vehicle and passing vehicle traffic and avoid blocking the cyclist's path. However, if this duration of time is less than the cyclist's estimated time of arrival at the autonomous vehicle's current location, then the autonomous vehicle can autonomously navigate out of the bike lane in order to reduce obstruction to the cyclist. The autonomous vehicle can then resume the block-circling scheme or reenter the bike lane once the cyclist passes.

The autonomous vehicle can implement similar methods and techniques: to identify, elect, and autonomously enter a bike lane adjacent the pickup location; and to selectively exit this bike lane responsive to detecting an approaching cyclist. The autonomous vehicle can also elect to wait for the user in a bike lane uproad of the pickup location prior to first arriving at the pickup location and can implement similar methods and techniques to identify an open bike lane up to three blocks ahead of the pickup location, enter this bike lane, and selectively exit this bike lane upon detecting an approaching cyclist or in response to the user arriving at or near the pickup location (e.g., as monitored by the remote computer system).

2.5.4 Bus Stop and Bus Lane Delay Scheme

The autonomous vehicle can implement similar methods and techniques to: detect a nearby bus stop (or bus lane) in the field around the autonomous vehicle and/or to identify this bus stop in the localization map; scan the field around the autonomous vehicle for an approaching bus (or other public transit vehicle); and then temporarily enter the bus stop (or bus lane) if no approaching bus is thus detected. Upon entering the bus stop (or bus lane), the autonomous vehicle can continue to monitor traffic approaching the rear of the autonomous vehicle for a bus and then automatically exit the bus stop (or bus lane) and resume the block-circling schema once a bus is detected.

The autonomous vehicle can similarly elect to stop in a bus lane adjacent or uproad of the pickup location, such as described above, and selectively exit this bus stop responsive to detecting an approaching bus.

2.5.5 Driveway Delay Scheme

The autonomous vehicle can implement similar methods and techniques to: detect a nearby driveway in the field around the autonomous vehicle and/or to identify this driveway in the localization map; scan the field around the autonomous vehicle for a second vehicle approaching the driveway from behind the autonomous vehicle or currently navigating along the driveway toward the autonomous vehicle; and then temporarily enter the driveway if no approaching vehicle is thus detected. Upon entering the driveway, the autonomous vehicle can continue to monitor traffic approaching the rear of the autonomous vehicle and monitor the driveway ahead of the autonomous vehicle for another vehicle attempted to enter or exit the driveway; the autonomous vehicle can then automatically exit the driveway and resume the block-circling schema in response to detecting such as vehicle.

The autonomous vehicle can similarly elect to stop in a driveway adjacent or uproad of the pickup location, such as described above, and selectively exit this driveway responsive to detecting an approaching vehicle.

2.5.6 Double-Parking Delay Scheme

Additionally or alternatively, when executing a block circling scheme, the autonomous vehicle can: regularly scan the field around the autonomous vehicle; monitor local traffic conditions; and elect to double-park on a street or alley while waiting for the user to arrive at the pickup location if the autonomous vehicle detects less than a threshold vehicle traffic density around the autonomous vehicle and/or if the autonomous vehicle fails to detect another vehicle approaching the rear of the autonomous vehicle. The autonomous vehicle can then enter a double-park location and regularly scan the field around the autonomous vehicle for an increase in traffic density or an approaching vehicle. For example, when local traffic density increased by more than a threshold proportional change, when local traffic density increases past a threshold density, or when the autonomous vehicle detects another approaching vehicle within a threshold distance (e.g., ten meters) of the rear autonomous vehicle, the autonomous vehicle can exit the parking location and resume the block-circling scheme, as described above.

The autonomous vehicle can similarly elect to double-park adjacent or uproad of the pickup location, such as described above, and selectively exit this double-park location responsive to detecting a change in local traffic conditions or an approaching vehicle.

2.5.7 Emergency Lane, Fire Hydrant Zone Delay Scheme

The autonomous vehicle can implement similar methods and techniques to: detect a nearby emergency lane or fire hydrant zone in the field around the autonomous vehicle and/or to identify this emergency lane or fire hydrant zone in the localization map; scan the field around the autonomous vehicle for an emergency vehicle nearby or approaching the autonomous vehicles current location; and then temporarily enter the emergency lane or fire hydrant zone if no emergency vehicle is detected nearby. Upon entering the emergency lane or fire hydrant zone, the autonomous vehicle can: continue to scan its surrounding field for an emergency vehicle (e.g., a police car, ambulance, or fire truck broadcasting red and/or blue light in its forward direction); monitor audible signals for a siren or alarm indicating an approaching emergency vehicle; actively scan a radio frequency channel for a traffic signal control command or other emergency signal broadcast by a nearby emergency vehicle; and then automatically exit the emergency lane or fire hydrant zone and resume the block circling scheme described above when the autonomous vehicle detects an emergency vehicle based on visual, audible, or radio frequency cues.

Similarly, the autonomous vehicle can automatically exit the emergency lane or fire hydrant zone and resume the block circling scheme upon receipt of an autonomous vehicle displace command: transmitted by an approaching emergency vehicle and received directly by the autonomous vehicle; transmitted by an emergency dispatcher, specifying a geographic area (e.g., an intersection or city block) currently occupied by the autonomous vehicle, and received directly by the autonomous vehicle; or received from the remote computer system, such as responsive to a command or inquiry from the emergency dispatcher.

The autonomous vehicle can similarly elect to stop in an emergency lane or fire hydrant zone adjacent or uproad of the pickup location, such as described above, and selectively exit this emergency lane or fire hydrant responsive to detecting an emergency vehicle, responsive to a command to exit this emergency lane or fire hydrant, or response to a command to disperse from the geographic area currently occupied by the autonomous vehicle. The autonomous vehicle can similar exit a double-park location, a driveway, a bus stop, a bus lane, or a geographic area generally in response to: detecting a nearby emergency vehicle; detecting an approaching emergency vehicle; or receiving a displace command from a nearby emergency vehicle, an emergency dispatcher, or the remote computer system.

2.5.8 Delay Schema by Default

In one variation, the remote computer system can implement methods and techniques described above to track the user's location via the user's mobile computing device as the autonomous vehicle first approaches the pickup location. If the remote computer system thus determines that the user is currently occupying the pickup location or within a threshold distance (e.g., ten meters) or time (e.g., ten seconds) of the pickup location, the remote computer system can dispatch the autonomous vehicle directly to the pickup location. The autonomous vehicle can then double-park at the pickup location by default or autonomously navigate into a wait location detected nearby—according to methods and techniques described above—in order to meet the user currently waiting at the pickup location and thus limit the user's total wait time. However, if the remote computer system determines that the user is not present at the pickup location or not within the threshold distance or time of the pickup location, the remote computer system can trigger the autonomous vehicle to execute delay schema. For example, the autonomous vehicle can then: execute the block-circling scheme described above, including scanning the field near the pickup location for viable wait locations; score these viable wait locations, such as weighted by type, proximity to the pickup location, and upstream distance from the pickup location; autonomously navigate into a highest-scoring wait location in this set; and exit the wait location and resume the block-circling schema responsive to detecting a related trigger condition or receiving a prompt to exit the wait location.

2.6 Returning to the Pickup Location

In the foregoing implementations, as the autonomous vehicle executes delay schema in order to limit obstruction to traffic flow and/or inconvenience to operators of other vehicles nearby, the remote computer system can: continue to track the user's mobile computing device (or receive geospatial locations from the native rideshare application executing on the user's mobile computing device); estimate the user's arrival time at the pickup location; and estimate the autonomous vehicle's arrival time at the pickup location based on its current location and local traffic conditions (e.g., monitored by the autonomous vehicle while executing these delay schema). Once the estimated time of arrival for the user differs from the estimated time of arrival of the autonomous vehicle by less than a threshold difference (e.g., 30 seconds), the remote computer system can trigger the autonomous vehicle to return to the pickup location to collect the user. The autonomous vehicle can then implement methods and techniques described above to enter a double-park location at the pickup location or to detect and enter a wait location nearby.

Additionally or alternatively, the native rideshare application can: prompt the user to enter her estimated time of arrival at the pickup location before submitting the rideshare request and/or as the autonomous vehicle nears the pickup location, such as by selecting a time to arrival from a dropdown menu (e.g., fifteen seconds, 30 seconds, one minute, two minutes, five minutes); and return the user's estimated time of arrival to the remote computer system. Similarly, the remote computer system can send a notification—to the user's mobile computing device—including a prompt to enter her estimated time of arrival at the pickup location, such as when the autonomous vehicle is first approaching the pickup location or after the autonomous vehicle transitions to executing delay schema after exiting the pickup location as described above. The remote computer system can transmit a command to the autonomous vehicle to return to the pickup location when the minimum estimated time for the autonomous vehicle to return to the pickup location differs from the estimated time for the user to arrive at the pickup location by less than a threshold difference (e.g., thirty seconds). The remote computer system can also time the autonomous vehicle's departure from its current wait location such that the autonomous vehicle arrives at the pickup location within a limited time (e.g., between ten and twenty seconds) before the user's estimated arrival.

Yet alternatively, the remote computer system can trigger the autonomous vehicle to return to the pickup location when the user's mobile computing device is detected within a threshold distance of the pickup location or in response to the user confirming—via the native rideshare application—that she is not present at the pickup location. The remote computer system can then transmit a notification to the user's mobile computing device indicating the autonomous vehicle's estimated time of arrival, such as in the form of an SMS text message, an in-application notification, or a page refresh within the native rideshare application.

2.7 Alternative Pickup Location

Alternatively, the remote computer system can elect an alternative pickup location and transmit a prompt to the user's mobile computing device to meet the autonomous vehicle at this alternate pickup location, as shown in FIG. 3. For example, if the autonomous vehicle previously arrived at the pickup location specified in the rideshare request, then departed the pickup location due to absence of the user, and is now downroad of the pickup location, the remote computer system can: estimate a time for the autonomous vehicle to navigate back to the pickup location based on local traffic conditions; and estimate a time for the user to arrive at the pickup location or prompt the user to enter her estimated time of arrival at the pickup location via her mobile computing device, such as described above. If the estimated time of arrival of the autonomous vehicle differs from the estimated time of arrival of the user at the pickup location by less than a threshold difference (e.g., thirty seconds), the remote computer system can dispatch the autonomous vehicle to return to the pickup location. However, if the estimated time of arrival of the autonomous vehicle and the estimated time of arrival of the user at the pickup location differ by more than the threshold difference, the remote computer system can elect an alternate pickup location. For example, the remote computer system can prompt the autonomous vehicle to remain in its current location and transmit a notification—to the user's mobile computing device—including the autonomous vehicle's current geospatial location and a prompt to walk to this geospatial location to meet the autonomous vehicle. In another example, the remote computer system can: identify a viable wait location (e.g., a loading zone, a driveway, a fire hydrant zone, etc.) upoad of the pickup location, such as based on scan data recently recorded by the autonomous vehicle while executing delay schema; elect this wait location as an alternate pickup location; dispatch the autonomous vehicle to this alternate pickup location; and transmit a notification—to the user's mobile computing device—including the geospatial location of the alternate pickup location and a prompt to walk to this geospatial location to meet the autonomous vehicle.

2.8 Multiple Passengers

In one variation, the autonomous vehicle, the remote computer system, and/or the instance of the native rideshare application executing on the user's mobile computing device cooperate to collect multiple passengers at the pickup location. In one implementation, the autonomous vehicle can: implement the foregoing methods and techniques to meet the user at the specified pickup location; render a prompt on an interior display of the autonomous vehicle to begin navigation to the user's specified dropoff location or to hold for a second passenger; and then execute a planned route to the dropoff location responsive to confirmation from the user. However, if the user prompts the autonomous vehicle to wait for a second passenger, the autonomous vehicle can implement the foregoing methods and techniques to hold at the pickup location and scan the field nearby for a trigger condition to leave the pickup location. If the autonomous vehicle detects such a trigger condition or receives a prompt from any vehicle operator, emergency vehicle, etc. to exit its current location at the pickup location prior to arrival of the second passenger, the autonomous vehicle can execute delay schema described above. For example, the autonomous vehicle can circle the block around the pickup location and immediately return to the pickup location. Alternatively, the autonomous vehicle can execute delay schema and return to the pickup location after a preset delay duration (e.g., two minutes). In this example, if the autonomous vehicle elects to wait in a parking space or other wait location other than at the pickup location during this delay duration, the autonomous vehicle can also enable the user currently occupying the autonomous vehicle to trigger the autonomous vehicle to leave this parking space or wait location, such as through a display and user interface inside the autonomous vehicle or through the native rideshare application executing on the user's mobile computing device. The autonomous vehicle can additionally or alternatively enable the user to select a parking space or wait location at which the autonomous vehicle may wait for the second passenger—such as through the display and user interface inside the autonomous vehicle or through the native rideshare application—until the end of this delay duration. The autonomous vehicle can then return to the pickup location to meet the second passenger and repeat the foregoing methods and techniques until the second passenger enters the autonomous vehicle or until a maximum wait timer for the rideshare request expires, at which time the autonomous vehicle can depart for the dropoff location specified in the rideshare request.

In another implementation, the native rideshare application executing on the user's mobile computing device can prompt the user to add additional passengers to the rideshare request, such as by selecting these other passengers from a contact list or by providing contact information for these other passengers. Alternatively, other passengers can connect to the rideshare request submitted by the user via instances of the native rideshare application executing on their mobile computing devices. The autonomous vehicle—in cooperation with the remote computer system and these instances of the native rideshare application—can then implement the foregoing methods and techniques to navigate to the pickup location to meet these passengers, execute delay schema if these passengers are not present at the pickup location when trigger conditions to exit the pickup location are detected, return to the pickup location as necessary to collect these passengers, and then autonomously navigate along a planned route to a specified dropoff location once each of these designated passengers has entered the autonomous vehicle or once the maximum wait timer for the rideshare request has expired.

The autonomous vehicle can implement similar methods and techniques to collect a second passenger from a second pickup location after collecting a first passenger from a first pickup location while executing a series of carpool-type rideshare requests, including enabling the first passenger to trigger the autonomous vehicle to leave a wait location via an interior display and user interface or via her mobile computing device, such as if the first passenger is uncomfortable in this wait location.

2.9 Dropoff Location

Upon arrival at the dropoff location specified in the rideshare request, the autonomous vehicle can implement methods and techniques described above to enter a double-park location at the dropoff location or to detect and enter a wait location nearby.

2.10 Variation: Delay Between Rideshare Cycles

In one variation, the autonomous vehicle can implement delay schema described above between completing a first rideshare request and receiving a next rideshare request. For example, after completing a first rideshare request and before receiving a next rideshare request, the autonomous vehicle can: execute a block circling scheme; scan the field around the autonomous vehicle for a viable wait location; autonomously navigate into a wait location; and selectively exit the wait location and return to the block-circling routine in response to a detected or received trigger condition in order to minimize obstruction to local traffic and to yield wait locations to other vehicles and emergency personnel nearby. The autonomous vehicle can then transition from a current delay scheme to autonomously navigating to a pickup location specified in a next rideshare request upon receipt of this rideshare request from the remote computer system.

In a similar example, the autonomous vehicle (or the remote computer system) can calculate a route from the pickup location to a dropoff location specified in the rideshare request. After the user enters the autonomous vehicle at the pickup location (or at an alternative wait location nearby), the autonomous vehicle can: autonomously navigate along this route to the dropoff location; scan a field around the autonomous vehicle for parking spaces at the dropoff location or once the user has exited the autonomous vehicle at the dropoff location; and then autonomously navigate into a parking space—currently unoccupied and downroad of the pickup location—once detected by the autonomous vehicle. Once in this parking space, the autonomous vehicle can also: render contact information and a prompt to displace the autonomous vehicle from the parking space via the contact information on an external display mounted to the autonomous vehicle; navigate out of the parking space in response to receipt of a command from an external entity via the contact information (e.g., another vehicle operator or from the remote computer system); and execute a block-circling scheme or other delay scheme while awaiting a next rideshare request. Then, in response to receiving a second rideshare request—specifying a second pickup location—from a second user, the remote computer system can dispatch the autonomous vehicle to the second pickup location to collect the second user; and the autonomous vehicle can autonomously navigate to the second pickup location accordingly and repeat the foregoing methods and techniques upon arrival at the second pickup location.

2.11 Variation: Autonomous Personal Mobility Vehicle

In one variation, the autonomous vehicle functions as an autonomous personal mobility vehicle. In this variation, the autonomous vehicle can implement Blocks of the second method S200 to: drop off a user (e.g., a rider, a lessee, or an owner of the autonomous vehicle) at a dropoff location; execute a delay routine—such as described below—while waiting for the user to return to the dropoff location or other designated pickup location nearby; and to autonomously navigate back to this pickup location to collect the user, such as when manually called by the user via the user's mobile computing device, when the user's mobile computing device enters a geofenced area around the pickup location, or in response to expiration of an away timer. For example, the user can select a destination at a restaurant, and the autonomous vehicle can: autonomously navigate to a dropoff location at the restaurant; set an away time based on an average duration of dinners at the restaurant or historical dining durations of the user at the same or similar restaurants; and then execute a delay routine, as described above, with priority for the parking in an open parking space nearby set as a default navigation mode.

In another example, the user selects a destination at a cinema, and the autonomous vehicle: autonomously navigates to a dropoff location at the cinema; sets an away time based on duration of a film selected by the user, a start time of the film, and a post-film buffer (e.g., five minutes); and then executes a delay routine, as described above, with priority for the parking in an open parking space nearby set as a default navigation mode.

In yet another example, the user selects a destination at a grocer, and the autonomous vehicle: autonomously navigates to a dropoff location at the grocer; records an away time set manually by the user; and then executes a delay routine, as described above, with priority for the parking in an open parking space nearby set as a default navigation mode if the away time is large or with priority for double-parking or autonomously circling the block set as a default navigation mode if the away time is small or if no parking spaces are available nearby.

In another example, the user selects a destination at a location of a business meeting, and the autonomous vehicle: autonomously navigates to a dropoff location near the location of the business meeting; sets an away time based on duration of the meeting extracted from a calendar invite and a post-meeting buffer (e.g., five minutes); and then executes a delay routine, as described above for the duration of the away time.

In this variation, the remote computer system can implement methods and techniques described above to track the user near the dropoff location and to automatically adjust the away time accordingly; the user can also interface with an instance of the native application executing on her mobile computing device to manually adjust the away time, as described above. However, the autonomous vehicle, remote computer system, and native application can implement Blocks of the second method S200 in any other way to drop off a user directly at a desired location and to automatically return to this location when the user is ready to leave the location, thereby both eliminating a need for the user to find a parking space upon arrival at this location and limiting wait time of the user when ready to leave the location.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for executing autonomous rideshare requests comprising:
   autonomously navigating an autonomous vehicle to a pickup location specified in a rideshare request submitted by a user, a user arrival timer and a depart timer being set for the rideshare request, the user arrival timer being set for a first duration and the depart timer being set for a second duration exceeding the first duration by a buffer time, a state of the user arrival timer provided to a mobile computing device affiliated with the user;
   rendering a state of the depart timer on an external display of the autonomous vehicle, the state of the depart timer communicating an intent of the autonomous vehicle externally;
   departing from the pickup location without the user in response to expiration of the user arrival timer if the user fails to arrive at the autonomous vehicle; and
   in response to the user arriving at the autonomous vehicle prior to expiration of the user arrival timer, departing from the pickup location with the user based on the depart timer.

2. One or more tangible non-transitory computer-readable storage media storing computer-executable instructions for performing a computer process on a computing system, the computer process comprising:
   setting a user arrival timer for a rideshare request submitted by a user, the rideshare request specifying a pickup location for an autonomous vehicle, the user arrival timer having a first duration;
   setting a depart timer for the rideshare request, the depart timer having a second duration, the second duration exceeding the first duration by a buffer time, a state of the depart timer being communicated external to the autonomous vehicle;

sending a state of the user arrival timer to a mobile computing device affiliated with the user;

causing the autonomous vehicle to depart the pickup location in response to expiration of the user arrival timer and a failure of the user to arrive at the autonomous vehicle; and causing the autonomous vehicle to depart the pickup location based on the depart timer in response to detection of the user arriving at the autonomous vehicle prior to expiration of the user arrival timer.

3. The method of claim 1, wherein departure of the autonomous vehicle from the pickup location without the user is delayed past the expiration of the user arrival timer based on a location of at least one of the user or the mobile computing device relative to the autonomous vehicle.

4. The method of claim 1, wherein the user arrival timer and the depart timer are set in response to the autonomous vehicle being double-parked at the pickup location.

5. The method of claim 1, wherein the user arrival timer and the depart timer are set in response to a presence of at least one other vehicle proximate to the pickup location.

6. The method of claim 1, wherein the buffer time is determined based on at least one of a number of passengers or an amount of luggage.

7. The method of claim 1, wherein the rideshare request is cancelled upon expiration of a maximum wait timer, the maximum wait timer having a third duration longer than the second duration.

8. The method of claim 1, further comprising:
determining a route traveling away from and back to the pickup location; and
autonomously navigating along the route following departure from the pickup location without the user.

9. The method of claim 8, wherein the route is determined based on an estimated travel duration along the route and an estimated time of arrival of the user at the pickup location.

10. The method of claim 1, further comprising:
determining a wait location different than the pickup location; and
autonomously navigating to the wait location following departure from the pickup location without the user.

11. The method of claim 1, wherein the autonomous vehicle moves from the pickup location without the user prior to expiration of the user arrival timer in response to at least one of a command or an approaching emergency vehicle having a path intersecting the pickup location.

12. The one or more tangible non-transitory computer-readable storage media of claim 2, wherein the autonomous vehicle departs the pickup location along a route returning to the pickup location in response to expiration of the user arrival timer and the failure of the user to arrive at the autonomous vehicle.

13. The one or more tangible non-transitory computer-readable storage media of claim 12, wherein the route is determined based on an estimated travel duration along the route and an estimated time of arrival of the user at the pickup location.

14. The one or more tangible non-transitory computer-readable storage media of claim 2, wherein the autonomous vehicle moves to a second location following departure from the pickup location in response to expiration of the user arrival timer and the failure of the user to arrive at the autonomous vehicle.

15. The one or more tangible non-transitory computer-readable storage media of claim 14, wherein the second location is selected from a list of potential locations determined based on at least one of a location type or a distance from the pickup location.

16. The one or more tangible non-transitory computer-readable storage media of claim 14, further comprising:
sending a notification of the second location to the mobile computing device.

17. The one or more tangible non-transitory computer-readable storage media of claim 2, wherein the autonomous vehicle moves from the pickup location prior to expiration of the user arrival timer in response to a command.

18. The one or more tangible non-transitory computer-readable storage media of claim 2, wherein the autonomous vehicle moves from the pickup location prior to expiration of the user arrival timer in response to an emergency.

19. The one or more tangible non-transitory computer-readable storage media of claim 2, wherein a state of the depart timer is communicated to at least one device.

20. The one or more tangible non-transitory computer-readable storage media of claim 19, wherein the at least one device is external to the autonomous vehicle.

* * * * *